(12) United States Patent
Laurin et al.

(10) Patent No.: US 11,570,948 B2
(45) Date of Patent: Feb. 7, 2023

(54) SINGLE HEIGHT ADJUSTMENT AND CONTROL ASSEMBLY FOR WALK-BEHIND OUTDOOR POWER EQUIPMENT

(71) Applicant: Briggs & Stratton, LLC, Wauwatosa, WI (US)

(72) Inventors: Robert S. Laurin, Durhamville, NY (US); E. Mark Lynch, Munnsville, NY (US); Derrick R. Camenga, Sherburne, NY (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 748 days.

(21) Appl. No.: 16/549,078

(22) Filed: Aug. 23, 2019

(65) Prior Publication Data

US 2020/0068802 A1 Mar. 5, 2020

Related U.S. Application Data

(60) Provisional application No. 62/745,515, filed on Oct. 15, 2018, provisional application No. 62/725,642, filed on Aug. 31, 2018.

(51) Int. Cl.
*A01D 34/74* (2006.01)
*A01D 34/69* (2006.01)
*A01D 101/00* (2006.01)

(52) U.S. Cl.
CPC .............. *A01D 34/74* (2013.01); *A01D 34/69* (2013.01); *A01D 2101/00* (2013.01)

(58) Field of Classification Search
CPC ........ A01D 34/74; A01D 34/67; A01D 34/69; A01D 2034/6837; A01D 2101/00
See application file for complete search history.

(56) References Cited

U.S. PATENT DOCUMENTS

| | | | | |
|---|---|---|---|---|
| 2,848,859 A | * | 8/1958 | Abel | A01D 34/74 |
| | | | | 280/43.16 |
| 3,874,151 A | * | 4/1975 | Seifert | A01D 34/63 |
| | | | | 280/43.13 |
| 4,041,679 A | * | 8/1977 | Seifert | F16D 67/02 |
| | | | | 56/11.3 |

(Continued)

FOREIGN PATENT DOCUMENTS

| | | | | |
|---|---|---|---|---|
| EP | 0803180 A1 | * | 10/1997 | |
| EP | 2248409 B1 | * | 11/2012 | A01D 34/74 |

(Continued)

*Primary Examiner* — Alicia Torres
(74) *Attorney, Agent, or Firm* — Foley & Lardner LLP

(57) ABSTRACT

Outdoor power equipment includes a frame, a power head, a hydrostatic transmission, a pair of rear drive wheels, a drive chain, and a wheel height adjustment mechanism. The hydrostatic transmission includes a drive gear configured to rotate about a first axis. The pair of rear drive wheels are coupled at respective ends of a rear drive axle, wherein the rear drive axle is operably coupled to a driven gear. The pair of rear drive wheels, the rear drive axle, and the driven gear are configured to rotate about a second axis. The drive chain is operably coupled to both the drive gear and the driven gear. The wheel height adjustment mechanism includes a first bell crank pivotally coupled to the frame about the first axis, with a first end of the first bell crank being coupled to the rear drive axle.

20 Claims, 16 Drawing Sheets

(56) References Cited

U.S. PATENT DOCUMENTS

| | | |
|---|---|---|
| 4,321,785 A | 3/1982 | Kaland |
| 4,785,612 A | 11/1988 | Morishita et al. |
| 4,811,552 A * | 3/1989 | Fujimoto ............... A01D 34/69 56/11.8 |
| 4,899,524 A | 2/1990 | Eilles |
| 5,426,926 A | 6/1995 | Delery et al. |
| 5,749,209 A | 5/1998 | Thomason |
| 6,378,280 B1 | 4/2002 | Bone et al. |
| 6,609,356 B2 | 8/2003 | Fackrell et al. |
| 6,729,116 B1 | 5/2004 | Graus et al. |
| 6,935,093 B2 | 8/2005 | Velke et al. |
| 7,395,648 B1 | 7/2008 | Silbernagel et al. |
| 8,069,639 B2 | 12/2011 | Fancher, III |
| 8,166,737 B2 | 5/2012 | Ninomiya et al. |
| 8,297,032 B2 | 10/2012 | Ninomiya et al. |
| 8,371,095 B2 | 2/2013 | Grewe et al. |
| 9,597,957 B2 | 3/2017 | Weber et al. |
| 2008/0245045 A1 | 10/2008 | Schick et al. |
| 2011/0173941 A1 | 7/2011 | Persson |
| 2012/0222395 A1* | 9/2012 | Grewe .................. A01D 34/74 56/17.2 |
| 2014/0083072 A1 | 3/2014 | Edholm et al. |
| 2017/0196167 A1 | 7/2017 | Zheng |
| 2017/0259666 A1 | 9/2017 | Weber et al. |
| 2018/0132418 A1* | 5/2018 | Bartel ................. A01D 34/824 |

FOREIGN PATENT DOCUMENTS

| | | | |
|---|---|---|---|
| EP | 2875710 A1 * | 5/2015 | ............. A01D 34/74 |
| GB | 1141011 A * | 1/1969 | |
| WO | 2016165755 A1 | 10/2016 | |
| WO | 2017129551 A1 | 8/2017 | |

\* cited by examiner

SINGLE HEIGHT ADJUSTMENT AND CONTROL ASSEMBLY FOR WALK-BEHIND OUTDOOR POWER EQUIPMENT

CROSS-REFERENCE TO RELATED APPLICATIONS

This application claims priority to U.S. Provisional Patent Application No. 62/725,642, filed on Aug. 31, 2018, and U.S. Provisional Patent Application No. 62/745,515, filed on Oct. 15, 2018, the disclosures of which are incorporated herein by reference in their entirety.

BACKGROUND

The present disclosure relates generally to outdoor power equipment such as lawnmowers, and, more particularly, to walk-behind lawnmowers having a single height adjustment arrangement for simultaneous height adjustment for all four wheels of the lawnmower, as well as a user control assembly for controlling the speed and direction of the lawnmower.

The use of outdoor power equipment such as walk-behind lawnmowers is prevalent among both commercial and residential operators due to, e.g., the mowers' relative light weight and maneuverability, convenience when mowing small lawns and/or difficult-to-reach locations, compact storage and transport requirements, etc. Many variations of walk-behind lawnmowers exist, from small, single-blade, electrically-driven mowers generally utilized in residential settings, to larger, multi-blade, engine-driven mowers used most often by commercial operators.

Depending on grass heights, mowing conditions, user preferences, etc., it is generally desirable for the height-of-cut settings of a lawnmower to be adjustable. For most ride-on lawnmowers and zero turn radius lawnmowers, a suspended mower deck is provided, allowing for the height-of-cut settings to be adjusted simply by raising or lowering the mower deck relative to the frame of the lawnmower. However, for most walk-behind lawnmowers, height-of-cut settings are adjusted by individually raising or lowering the height of each of the four wheels of the lawnmower. While such a height adjustment method allows the entire mower deck, blade(s), and power head (e.g., an engine) to raise or lower together, thereby avoiding the complexities of the belt-and-pulley systems utilized on most ride-on and zero turn radius lawnmowers, the need to adjust the height at each wheel is both time consuming and prone to user error. If the height of each wheel is not set equally, the blade(s) will become angled relative to the cutting surface, leading to an uneven cut.

This patent document described devices that are intended to address the issues discussed above and/or other issues.

SUMMARY

In accordance with an aspect of the disclosure, an outdoor power equipment unit is disclosed. The outdoor power equipment unit includes a frame and a power head coupled to the frame. The unit also includes a hydrostatic transmission coupled to the frame and operatively coupled to the power head, wherein the hydrostatic transmission comprises a drive gear configured to rotate about a first axis. A pair of rear drive wheels may also be coupled at respective ends of a rear drive axle, wherein the rear drive axle is operably coupled to a driven gear, and further wherein the pair of rear drive wheels, the rear drive axle, and the driven gear are configured to rotate about a second axis different than the first axis. A drive chain may be operably coupled to both the drive gear and the driven gear. Also, a wheel height adjustment mechanism may be provided, wherein the wheel height adjustment mechanism comprises a first bell crank pivotally coupled to the frame about the first axis, and further wherein a first end of the first bell crank is coupled to the rear drive axle.

According to another aspect of the disclosure, a walk-behind lawnmower is disclosed. The walk-behind lawnmower may include a frame and a power head coupled to the frame. The lawnmower may also include a mower deck coupled to the frame. A hydrostatic transmission may be coupled to the frame and operatively coupled to the power head, wherein the hydrostatic transmission comprises a drive gear configured to rotate about a first axis. A pair of front wheels may also be provided. A pair of rear drive wheels may be coupled at respective ends of a rear drive axle, wherein the rear drive axle is operably coupled to a driven gear, and further wherein the pair of rear wheels, the rear drive axle, and the driven gear are configured to rotate about a second axis. A drive chain operably may be coupled to both the drive gear and the driven gear. A wheel height adjustment mechanism may also be provided, wherein the wheel height adjustment mechanism comprises at least one rear bell crank pivotally coupled to the frame about the first axis, and further wherein a first end of the at least rear one bell crank is coupled to the rear drive axle such that movement of the rear drive axle relative to the frame does not affect tension of the drive chain between the drive gear and the driven gear.

According to another aspect of the disclosure, a control assembly for use with outdoor power equipment is disclosed. The control assembly may include a control housing. The control assembly may also include a speed control lever extending from the control housing, wherein the speed control lever is coupled to an asymmetric body portion. The asymmetric body portion may be pivotally coupled to the control housing, and the asymmetric body may have a plurality of projections formed on a radial surface the asymmetric body portion. The control assembly may also include a forward speed control handle. The forward speed control handle may be coupled to one or more primary arcuate brackets. The one or more primary arcuate brackets may be pivotally coupled to the control housing. Additionally, the one or more primary arcuate brackets may be limited in rotational travel by at least one of the plurality of projections formed on the radial surface of the asymmetric body portion.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "top", and "bottom" are not intended to limit the invention to a particular direction or orientation, but instead are only intended to denote relative positions, or positions corresponding to directions shown when a mower is oriented as shown in the Figures.

Referring to FIGS. 1-7, outdoor power equipment in the form of a walk-behind lawnmower 10 is shown. For the sake of clarity, some components typically associated with walk-behind lawnmowers have been omitted from FIGS. 1-7, including mower deck and drive system shielding, drive system linkages, etc. However, one of ordinary skill in the art will readily recognize that these components may be incorporated into walk-behind lawnmower 10 in accordance with the embodiments described in this document.

Figure 1:
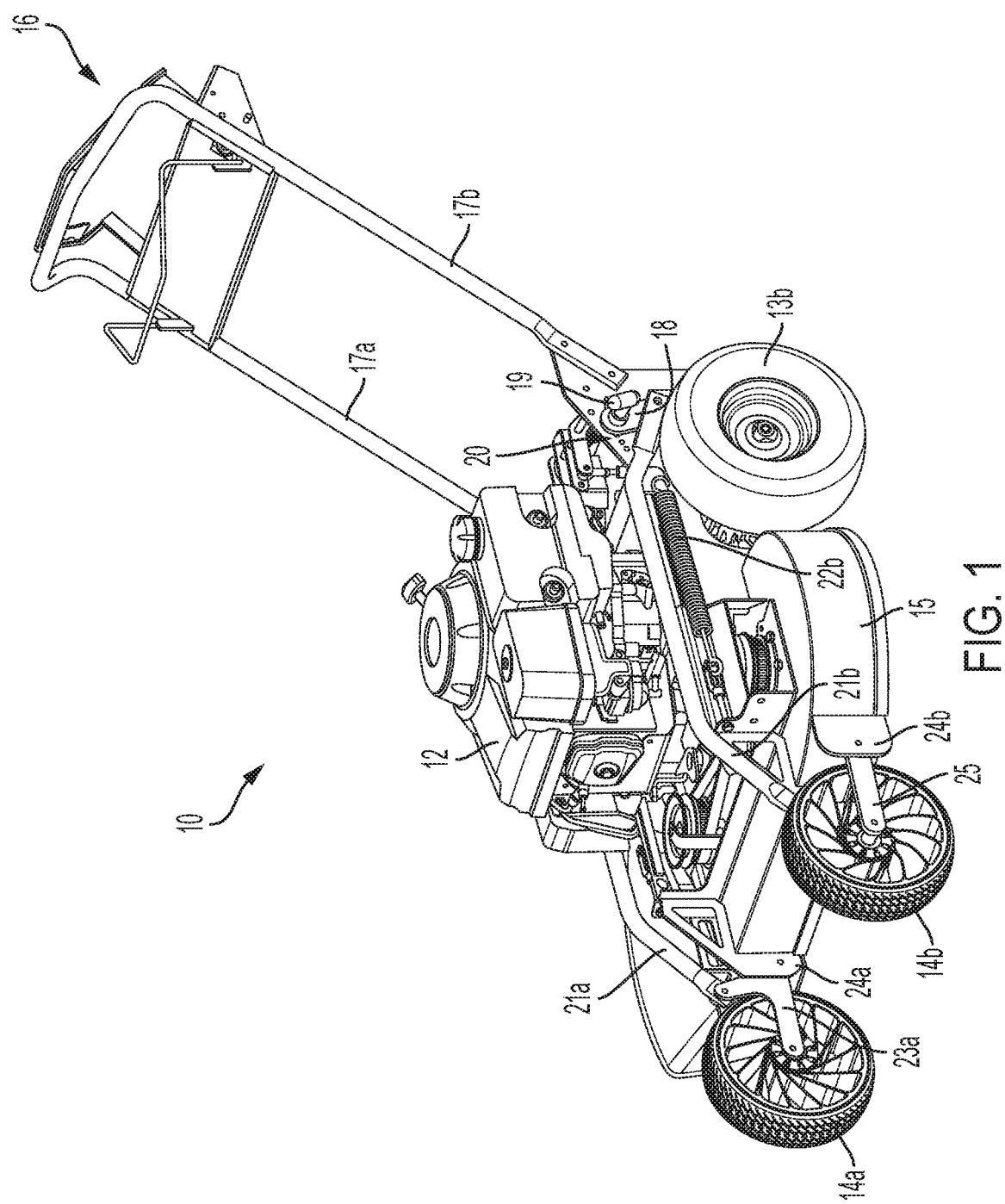
FIG. 1 is a front perspective view of a walk-behind lawnmower having a single height adjustment configuration in accordance with an aspect of the disclosure.
Figure 2:
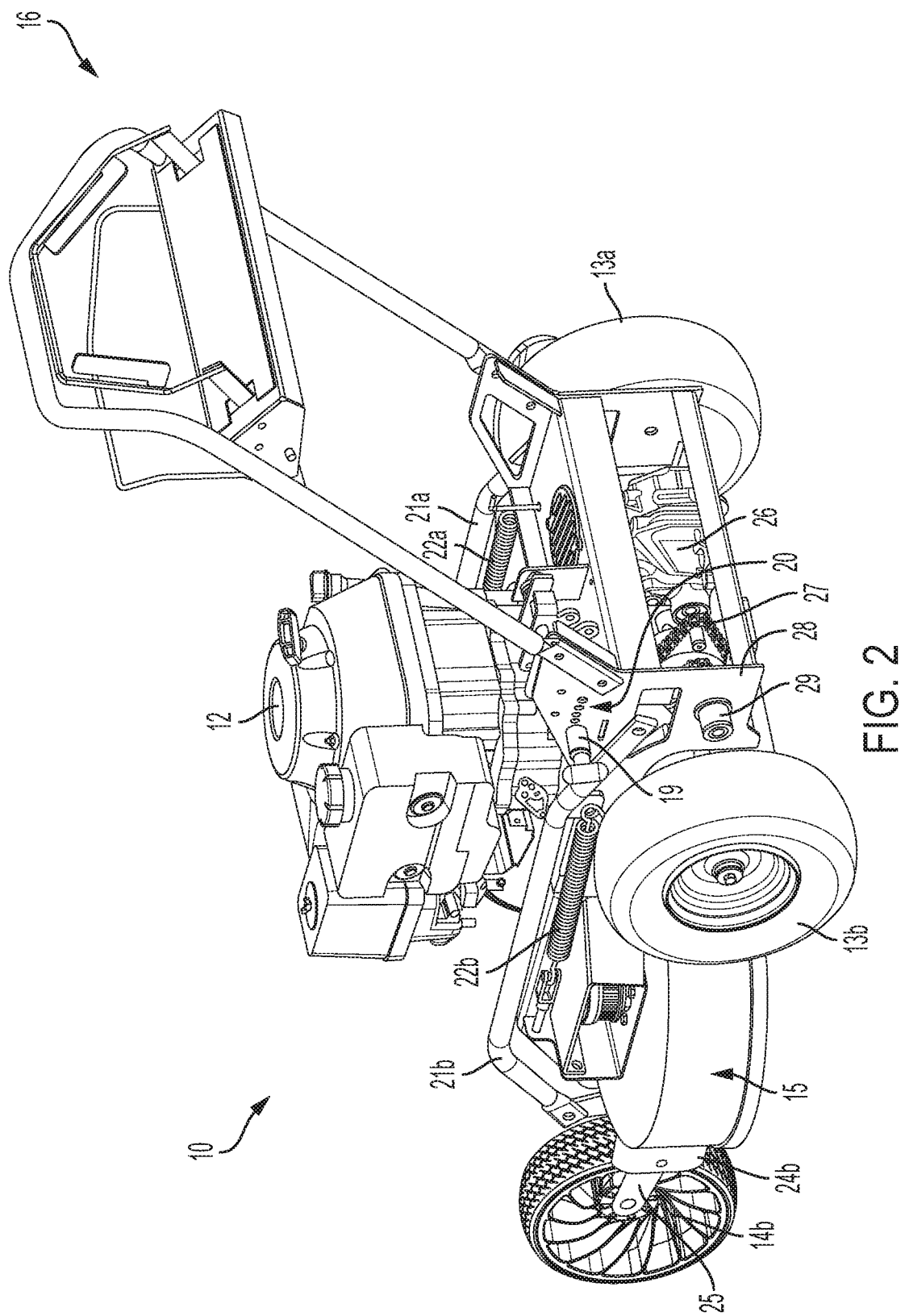
FIG. 2 is a partial rear perspective view of the walk-behind lawnmower illustrated in FIG. 1.

As shown in FIGS. 1-2, walk-behind lawnmower 10 includes a pair of rear drive wheels 13a, 13b, as well as a pair of front wheels 14a, 14b. A power head in the form of an internal combustion engine 12 is provided to power both the rear drive wheels 13a, 13b and the one or more mower blades (not shown) carried by a mower deck 15. Specifically, rear drive wheels 13a, 13b may be driven in both forward and reverse directions by a hydrostatic transmission 26 which, as will be described further herein, is operably coupled to engine 12 via a belt-and-pulley arrangement. The hydrostatic transmission 26 is configured to drive the rear drive wheels 13a, 13b by way of a drive chain 27, as will also be described further below. The one or more mower blades within mower deck 15 are similarly driven by the engine 12 via another belt-and-pulley arrangement. However, it is to be understood that a power head other than an internal combustion engine may be utilized to provide power to the rear drive wheels 13a, 13b and/or the one or more mower blades. For example, one or more battery-powered electric motors may be utilized in lieu of the engine 12.

Referring still to FIGS. 1-2, walk-behind lawnmower 10 also includes user controls 16 provided on an end of a pair of extended arms 17a, 17b, which are coupled to respective sides of a frame 28. While not shown or described in detail, it is to be understood that user controls 16 may include, e.g., forward and reverse directional drive and speed controls, stationary handle(s), a blade-engagement control, etc. Furthermore, while not shown, the directional drive and speed controls of the user controls 16 may be coupled to a hydrostatic transmission interface 30 (see FIG. 3) by way of one or more control linkages.

As described above, the mower deck of most residential and light commercial walk-behind lawnmowers remains fixed relative to the lawnmower's frame or, in many cases, substantially forms the lawnmower's frame). Thus, in order to adjust the height-of-cut, conventional walk-behind lawnmowers necessitate an adjustment in wheel height at each individual wheel. Walk-behind lawnmower 10 is no different, as mower deck 15 is coupled to, and remains stationary relative to, frame 28. However, as will be described in further detail below, unlike previous methods for height-of-cut adjustment for walk-behind lawnmowers, walk-behind lawnmower 10 includes a single height adjustment mechanism for the simultaneous and coordinated height adjustment of all four wheels 13a, 13b, 14a, 14b relative to the frame 28.

As shown in FIGS. 1-4, rear drive wheels 13a, 13b are operably coupled to a rear bell crank 18, with rear bell crank 18 configured to be pivotally coupled to frame 28 about a pivot joint 29. Specifically, a common rear drive axle 32 upon which rear drive wheels 13a, 13b are rotatably mounted is coupled to a first end portion of rear bell crank 18, while a second end portion of rear bell crank 18 is coupled to a retractable pin member 19. Retractable pin member 19 is configured to selectively engage one of a plurality of incrementally-spaced through-holes 20 formed in a portion of the frame 28. In some embodiments, retractable pin member 19 may be spring-biased so as to hold pin member 19 in a "closed" position (i.e., a position engaged with one of the plurality of through-holes 20). Thus, when the user wishes to change the height of rear drive wheels 13a, 13b relative to frame 28, the user may simply retract pin member 19 from one of through-holes 20 and pivot rear bell crank 18 about pivot joint 29 until pin member 19 is aligned with another of through-holes 20 corresponding to a desired height.

While not shown in FIGS. 1-4, the frame 28 may include indicia (e.g., height-of-cut in inches, incremental numerical indicators, etc.) at or near each of through-holes 20 so as to provide the user with a visual understanding of the possible height-of-cut adjustments. Due to the inherent nature of rear bell crank 18, as the user pivots the rear bell crank 18 from one through-hole 20 to another, the rear drive wheels 13a, 13b move along an arcuate path such that raising the height-of-cut causes rear drive wheels 13a, 13b to move both downward and rearward relative to the user controls, while lowering the height-of-cut causes rear drive wheels 13a, 13b to move both upward and forward relative to the user controls. The user may then lock rear drive wheels 13a, 13b in a desired position by engaging the pin member 19 with a desired through-hole 20.

Figure 5:
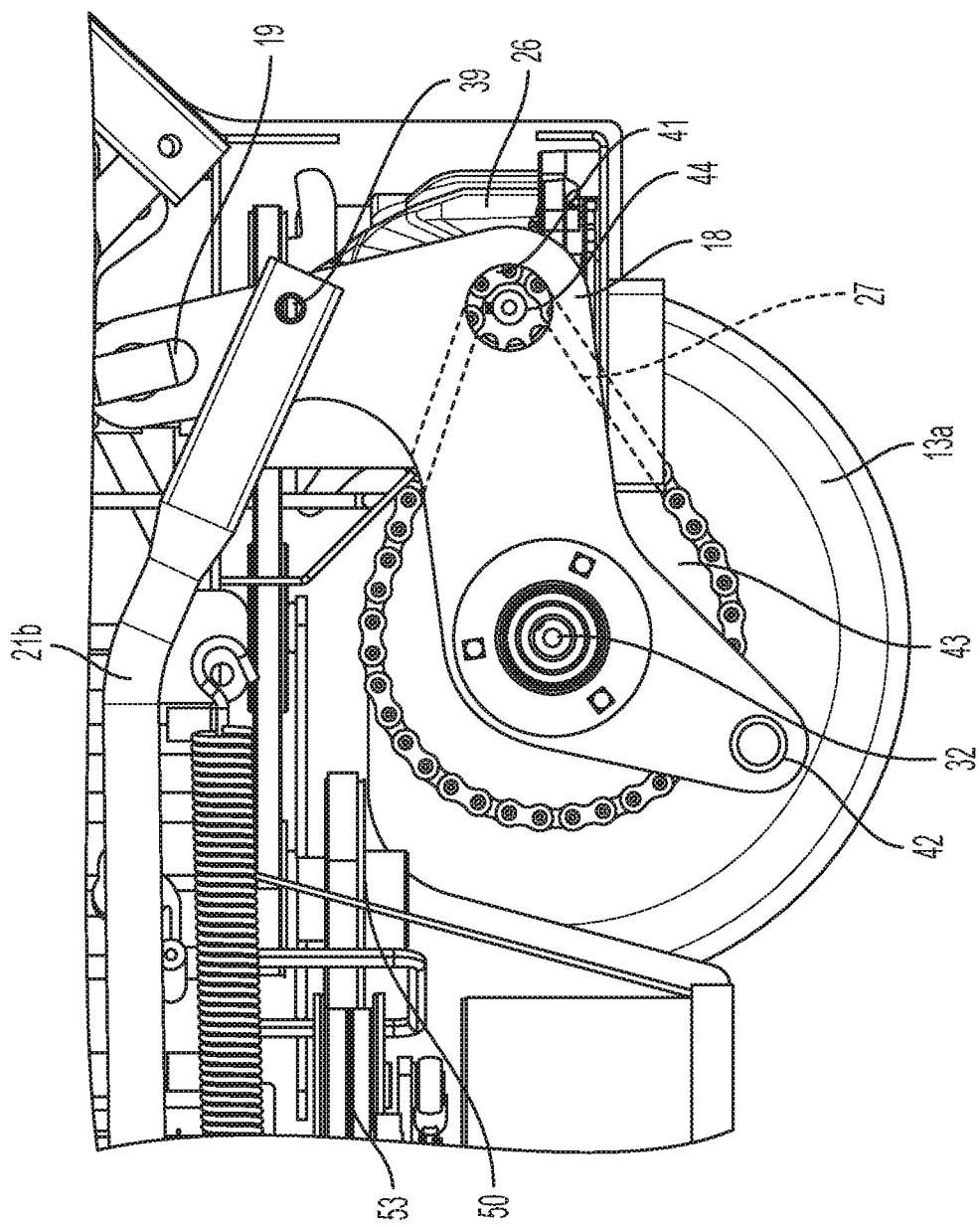
FIG. 5 is a partial side view of components of a height adjustment configuration and wheel drive configuration of the walk-behind lawnmower illustrated in FIG. 1.
Figure 6:
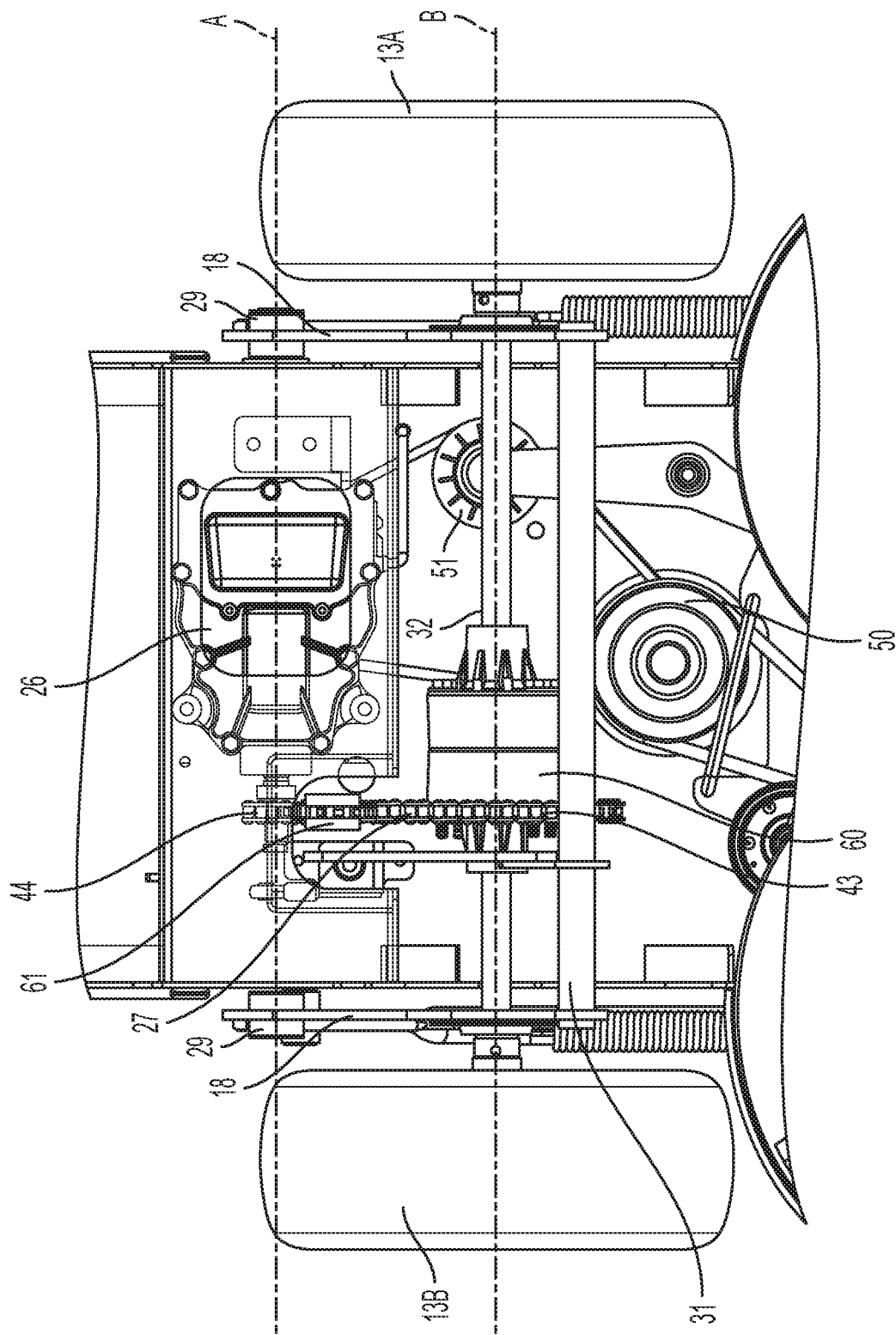
FIG. 6 is a partial bottom view of components of a height adjustment configuration and wheel drive configuration of the walk-behind lawnmower illustrated in FIG. 1.

As is shown in FIG. 6, a second bell crank 18 is pivotally coupled to frame 28 at a location near rear drive wheel 13a, thereby allowing rear drive wheels 13a, 13b to be displaced equally when adjustments to height-of-cut are made. For this reason, the second bell crank 18 does not necessitate its own retractable pin member, allowing for a single height adjustment mechanism to be utilized. Furthermore, while the respective bell cranks 18 are coupled by the common rear drive axle 32, each bell crank 18 may also be coupled by a rod 31. Specifically, referring to FIG. 3, FIG. 5, and FIG. 6, rod 31 is configured to extend from a mounting location 42 at an end of rear bell crank 18 to a similar mounting location at an end of the opposite bell crank 18. In this way, rod 31 provides for additional structural support between the respective bell cranks. Furthermore, rod 31 is positioned in such a way so as to provide at least some protection to various components of the drive train coupled to rear drive axle 32, which will be described in further detail below.

Figure 3:
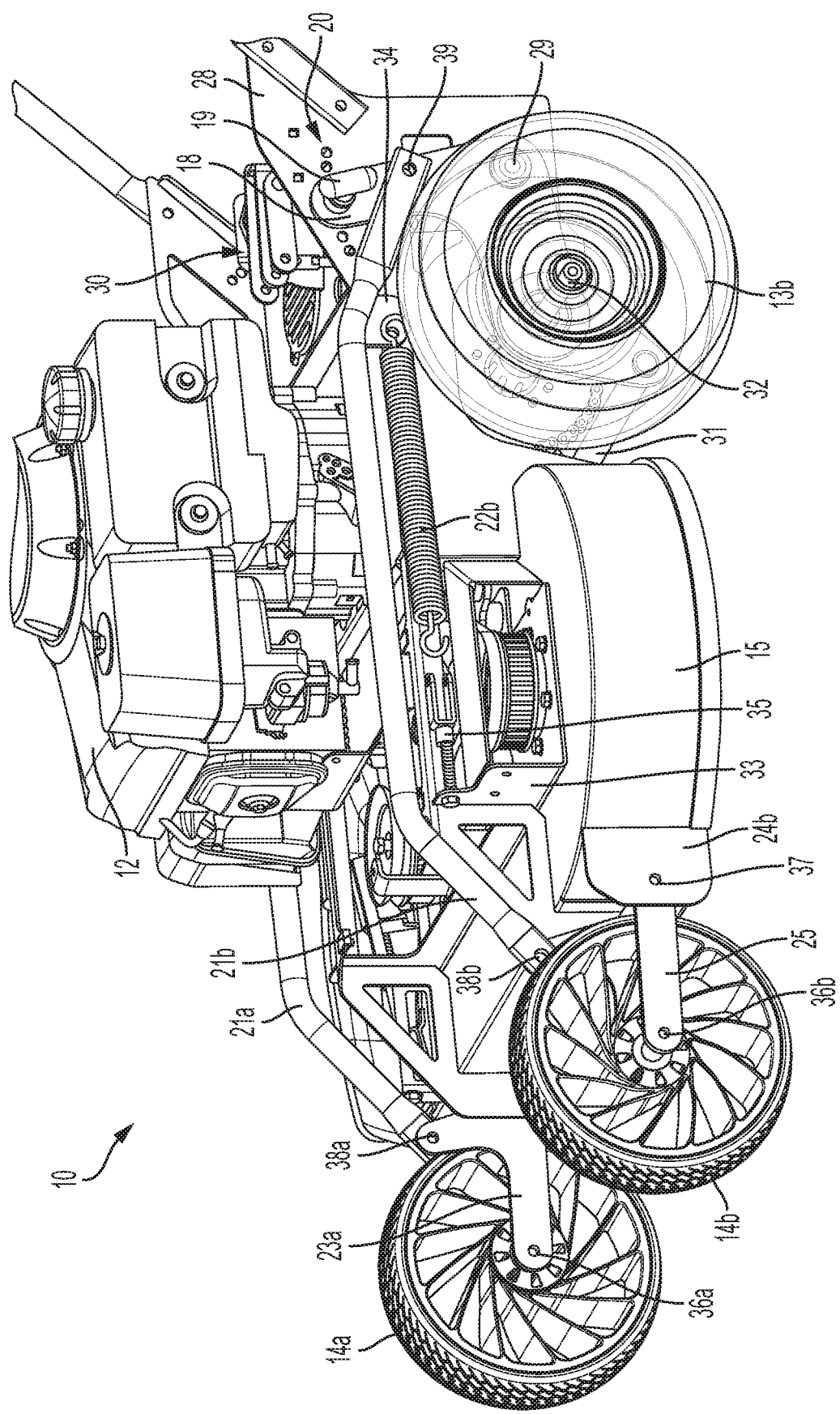
FIG. 3 is a partial front perspective view of the walk-behind lawnmower illustrated in FIG. 1.
Figure 4:
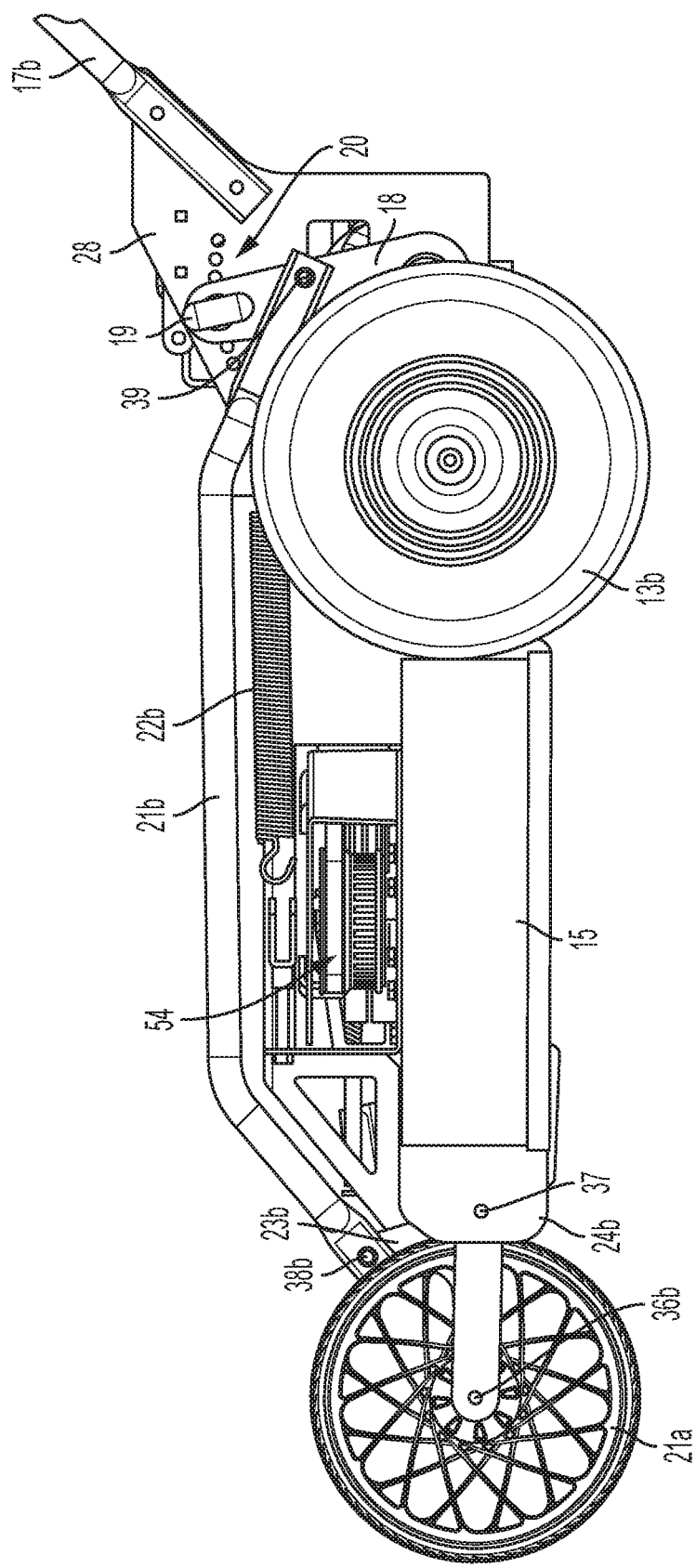
FIG. 4 is a partial side view of the walk-behind lawnmower illustrated in FIG. 1.

In addition to the simultaneous height adjustment of both of rear drive wheels 13a, 13b relative to frame 28 via a single height adjustment mechanism, walk-behind lawn-mower 10 also provides for the simultaneous height adjustment of both of the front wheels 14a, 14b via the same height adjustment mechanism. That is, referring to FIGS. 1-6, a pair of height adjustment linkages 21a, 21b extend from the respective rear bell cranks (i.e., rear bell crank 18 and the corresponding opposite bell crank (shown in FIG. 6)) to a pair of respective front bell cranks 23a, 23b which are pivotally coupled to respective front wheels 14a, 14b. For example, as is shown in FIGS. 3-5, a first end of a linkage 21b is pivotally coupled to rear bell crank 18 at a pivot point 39, while a second, opposite end of linkage 21b is pivotally coupled to a first end of a front bell crank 23b at a pivot point 38b. Front bell crank 23b is itself configured to pivot about an axis 37 upon a bracket 24b, with bracket 24b extending substantially from a front portion of mower deck 15. The front wheel 14b is, in turn, configured to rotate about an axis 36b located at a second, opposite end of front bell crank 23b. While not described herein, it is to be understood that various components on the opposite side of walk-behind lawnmower 10 (i.e., front wheel 14a, bell crank 23a, axis 36a, pivot point 38a, bracket 24a) operate in a same or similar manner. In this way, movement of rear bell crank 18 (and the other, opposite rear bell crank) imparts corresponding movement on front bell cranks 23a, 23b via the respective linkages 21a, 21b. This, in turn, provides for corresponding arcuate movement of front wheels 14a, 14b simultaneous to movement of rear drive wheels 13a, 13b during height-of-cut adjustments, all while using a single height adjustment mechanism provided by the interface between pin member 19 and through-holes 20. Furthermore, with this arcuate movement, not only are the front wheels 14a, 14b and the rear drive wheels 13a, 13b simultaneously adjusted in height relative to the frame 28, but the wheelbase between respective front wheels 14a, 14b and rear drive wheels 13a, 13b remains constant, regardless of the height-of-cut selected.

Referring to FIGS. 3-4, respective front bell cranks 23a, 23b are shown as being coupled to respective brackets 24a, 24b along an inner side of respective front wheels 14a, 14b, while a straight pivot arm 25 is provided along an outer side of each of front wheels 14a, 14b. However, in other embodiments, it is to be understood that front bell cranks 23a, 23b may instead be provided along the outer side of each of front wheels 14a, 14b, or a pair of bell cranks may be provided along both the inner and outer sides of each of front wheels 14a, 14b. Additionally and/or alternatively, while a pair of linkages 21a, 21b is shown, it is to be understood that, in some embodiments, a single linkage may extend between one of the rear bell cranks 18 and one of the front bell cranks 23a, 23b if the front bell cranks 23a, 23b are otherwise coupled together (i.e., via a rod or other solid linkage extending directly between front bell cranks 23a, 23b).

As is also shown in FIGS. 1-4, each linkage 21a, 21b may be coupled to a respective extension spring 22a, 22b, wherein each extension spring 22a, 22b is configured to assist in the raising and lowering of rear drive wheels 13a, 13b and front wheels 14a, 14b relative to frame 28. Specifically, referring to FIG. 3, a first end of extension spring 22b is coupled to linkage 21b at a mounting bracket 34, while a second, opposite end of extension spring 22b is configured to be coupled to a threaded, adjustable receiver 35, which is itself coupled to a mounting plate 33 extending from a top surface of mower deck 15. While not shown, it is to be understood that extension spring 22a is similarly configured. In this way, as the user removes pin member 19 to adjust the height-of-cut, the extension springs 22a, 22b act to aid the user in raising the height-of-cut (i.e., lowering the wheels relative to the frame 28) by effectively pulling the linkages 21a, 21b and rear bell cranks 18 in a forward direction. Conversely, the extension springs 22a, 22b also may aid in the lowering of the height-of-cut by dampening the upward movement of the wheels, which, without the extension springs 22a, 22b, would otherwise be abrupt due to the overall weight of the frame 28, the transmission 26, the engine 12, etc.

Next, referring to FIGS. 5-6, more detailed views of various components of the drive train of walk-behind lawnmower 10 is shown. As described above, walk-behind lawnmower 10 is driven by a hydrostatic transmission 26, which is itself powered by an internal combustion engine 12 via a drive pulley 50. Similar to internal combustion engine 12, hydrostatic transmission 26 is coupled to frame 28 in a fixed position. Depending upon the user inputs, the hydrostatic transmission 26 may drive the rear drive axle 32 in either a forward or reverse direction. The rear drive axle 32 has a driven gear 43 non-rotatably coupled thereon via a differential 60, while the hydrostatic transmission 26 includes a drive gear 44 configured to rotate based on a user-selected speed and direction. A drive chain 27 provides a connection between the drive gear 44 and driven gear 43, thereby imparting rotational motion on rear drive axle 32 (and, in turn, rear drive wheels 13a, 13b) based on user inputs to the hydrostatic transmission 26. A tensioning sprocket 61 may also be provided, which may aid in maintaining proper tension on drive chain 27, as well as aid in preventing drive chain 27 from dropping from drive gear 44 and/or driven gear 43. Furthermore, while a drive chain 27 is shown, it is to be understood that an alternative driving member, such as, e.g., a belt, may be utilized. Similarly, while drive gear 44 and driven gear 43 are shown, it is to be understood that an alternative rotatable member, such as, e.g., a drive pulley and a driven pulley, may be utilized.

With this drive train configuration, the rear drive wheels 13a, 13b may be raised and lowered via the respective rear bell cranks 18 relative to frame 28 without adversely affecting the tension of drive chain 27 between driven gear 43 and drive gear 44. That is, as bell cranks 18 partially rotate about pivot joint 29 during a height-of-cut adjustment, the rear drive wheels 13a, 13b do not move in a strictly vertical fashion. Rather, rear drive wheels 13a, 13b are displaced in an arcuate fashion centered around axis A shown in FIG. 6. Referring still to FIG. 6, due to the substantially coaxial alignment of pivot joint 29 with drive gear 44 of hydrostatic transmission 26 about an axis A, and the substantially coaxial alignment of driven gear 43, differential 60, and rear drive axle 32 about an axis B, the arc through which the rear drive axle 32 and rear drive wheels 13a, 13b travel during height-of-cut adjustments does not adversely affect the tension of drive chain 27, thereby allowing the rear drive wheels 13a, 13b to move relative to the hydrostatic transmission 26 without altering the overall drive capabilities of the walk-behind lawnmower 10.

Figure 7:
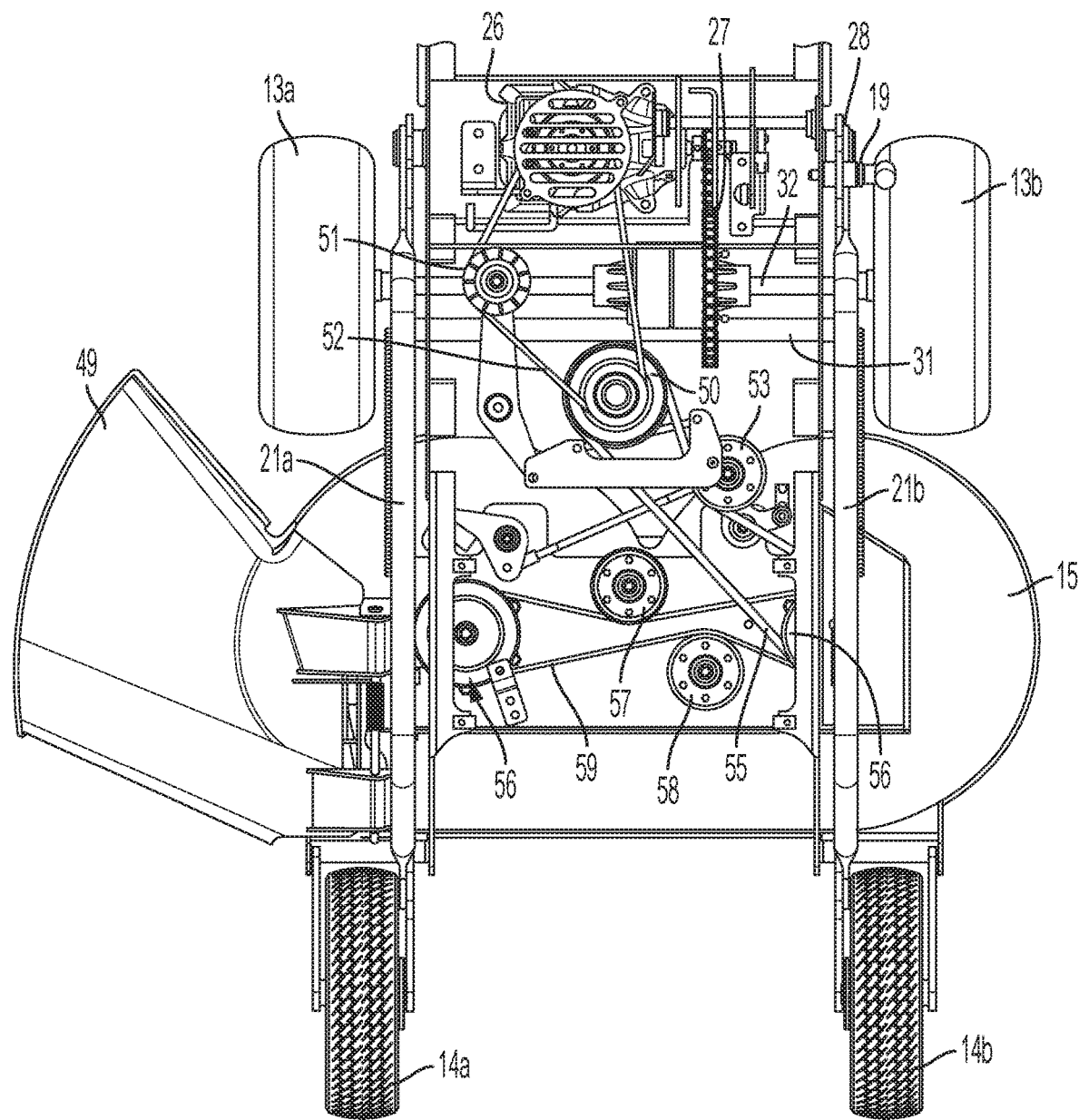
FIG. 7 is a partial top view of components of a height adjustment configuration, wheel drive configuration, and mower blade drive configuration of the walk-behind lawnmower illustrated in FIG. 1.

Next, referring to FIGS. 6-7, in accordance with an aspect of the disclosure, belt-and-pulley arrangements for the drive of both the hydrostatic transmission 26 and the mower blades of the mower deck 15 are shown. As described above, the mower deck 15 is configured to include one or more mower blades (not shown), which are configured to cut grass and other vegetation, expelling the cuttings out of the mower deck 15 through a guard 49. In the specific configuration shown in FIG. 7, mower deck 15 is configured to have two mower blades (not shown), with each mower blade coupled to a respective driven pulley 56. However, it is to be understood that more or fewer mower blades (and, hence, driven pulleys) may be utilized.

Drive pulley 50, as detailed above, is coupled to the engine 12. As shown in FIG. 7, a first driven pulleys 56 is directly coupled to the drive pulley 50 by way of a main belt 55, while the other of the driven pulleys 56 is coupled to the first driven pulley 56 by way of a secondary belt 59. A number of idler pulleys 53, 57, 58 are provided so as to maintain belt tension and optimal belt-pulley surface contact. Thus, as the drive pulley 50 rotates at high speeds when the user engages the mower blades via the user controls, the mower blades within mower deck 15 correspondingly rotate at high speeds to provide ideal cutting performance.

In addition to the drive pulley 50 driving the various mower blades, drive pulley 50 also selectively drives the hydrostatic transmission 26 via a drive belt 52 and an intervening tensioning pulley 51. Accordingly, similar to the drive of the mower blades, the user is able to selectively control the operation of the hydrostatic transmission 26 in order to impart forward or reverse motion on rear drive wheels 13a, 13b, thereby controlling the speed and/or direction of the walk-behind lawnmower 10.

As was noted above, the mower deck 15 is fixed relative to frame 28, as are the engine 12 and the hydrostatic transmission 26. Thus, even with changes in height-of-cut made by movement of rear drive wheels 13a, 13b and front wheels 14a, 14b upon their respective bell cranks, the angles of all belts and pulleys in the arrangement shown in FIG. 7 do not change. Thus, unlike suspended mower decks, which require relatively complex belt-and-pulley arrangements and spacing considerations to account for angular changes from the drive pulley to the driven pulleys based on deck height changes, the height-of-cut arrangement described herein with respect to FIGS. 1-7 does not necessitate such complex belt-and-pulley arrangements and spacing considerations, as the mower deck 15, engine 12, and hydrostatic transmission 26 are fixed relative to frame 28 and, thus, move in concert with one another during height-of-cut adjustments.

While the walk-behind lawnmower 10 described above pertains to a light commercial-grade walk-behind lawnmower utilizing a hydrostatic transmission and belt-driven mower deck, the height-of-cut adjustment configurations described herein may also be applicable to other forms of walk-behind lawnmowers, including those utilizing a single mower blade driven directly by a power head (e.g., an internal combustion engine, an electric motor, etc.). Furthermore, while walk-behind lawnmower 10 illustrates a rear-wheel drive lawnmower, the concept is applicable to a front-wheel drive lawnmower or a push mower without assisted drive capabilities.

Figure 8:
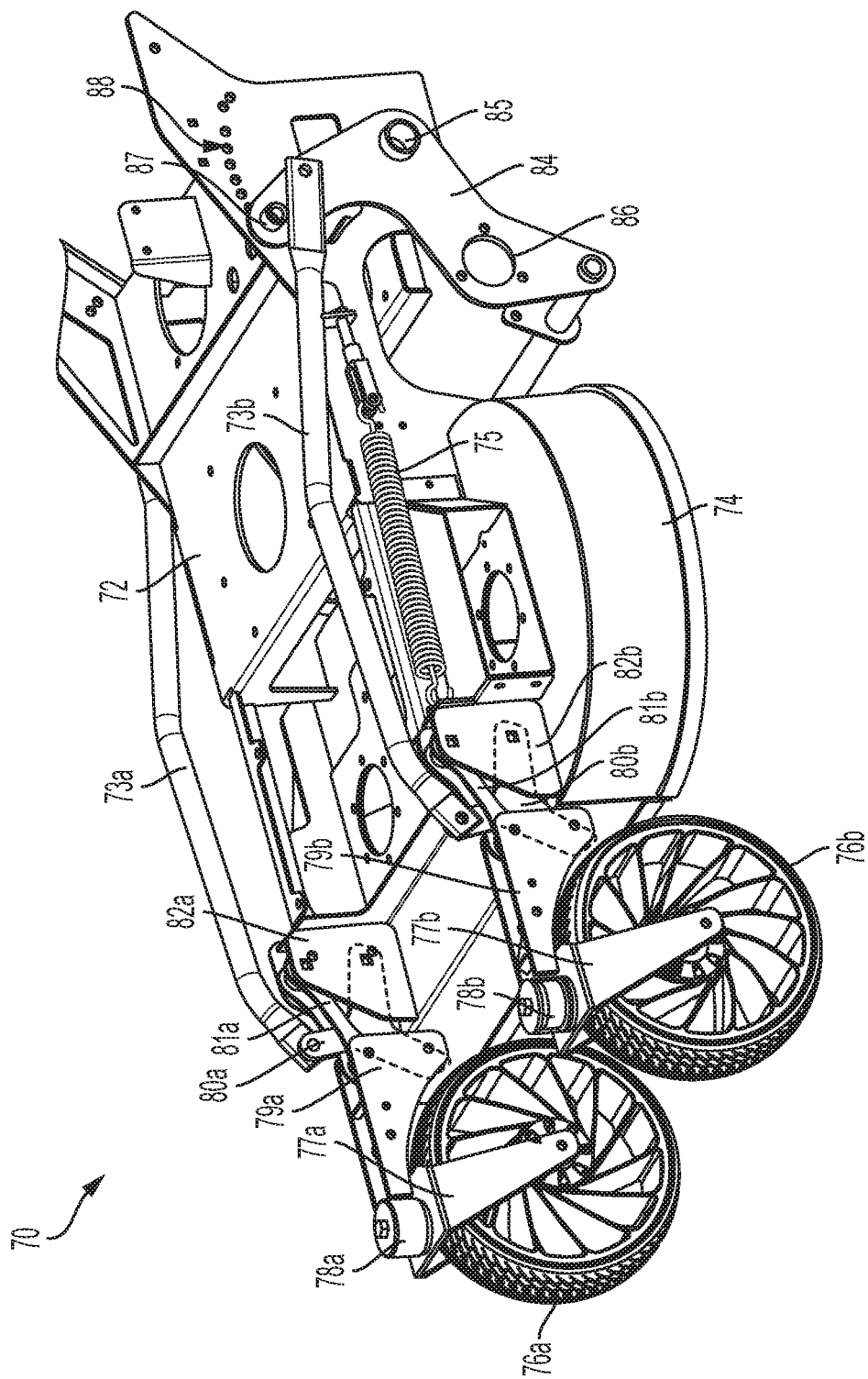
FIG. 8 is a partial front perspective view of a walk-behind lawnmower having a single height adjustment configuration in accordance with another aspect of the disclosure.

Next, referring to FIG. 8, a partial view of a walk-behind lawnmower 70 having a single height adjustment configuration in accordance with another aspect of the disclosure is shown. For the purposes of clarity, numerous components of the walk-behind lawnmower 70 have been omitted from the view shown in FIG. 8. For example, it is to be understood that walk-behind lawnmower 70 may include a pair of rear drive wheels, an engine, a hydrostatic transmission, control handles, etc., similar to those found on walk-behind lawnmower 10 shown and described above with respect to FIGS. 1-7.

Walk-behind lawnmower 70 includes a frame 72, upon which a power head and hydrostatic transmission (not shown) are fixedly coupled. Also fixedly coupled to frame 72 is a mower deck 74, which allows frame 72 and mower deck 74 (as well as the power head and hydrostatic transmission) to move in concert with one another during height-of-cut adjustments. However, as will be described in further detail below, unlike previous methods for height-of-cut adjustment for walk-behind lawnmowers, walk-behind lawnmower 70, like walk-behind lawnmower 10, includes a single height adjustment mechanism for the simultaneous and coordinated height adjustment of all four wheels relative to the frame 72.

As shown in FIG. 8, and similar to walk-behind lawnmower 10 described above, the rear drive wheels (not shown) are configured to be operably coupled to a rear bell crank 84, with rear bell crank 84 being pivotally coupled to frame 72 about a pivot joint 85. The rear drive wheels are pivotably mounted upon a drive axle (not shown) about a pivot joint 86 at a first end portion of rear bell crank 84, while a second end portion of rear bell crank 84 is coupled to a retractable pin member 87. Retractable pin member 87 is configured to selectively engage one of a plurality of incrementally-spaced through-holes 88 formed in a portion of the frame 72. In some embodiments, retractable pin member 87 may be spring-biased so as to hold pin member 87 in a "closed" position (i.e., a position engaged with one of the plurality of through-holes 88). Thus, when the user wishes to change the height of rear drive wheels relative to frame 72, the user may simply retract pin member 87 from one of through-holes 88 and pivot rear bell crank 84 about pivot joint 85 until pin member 87 is aligned with another of through-holes 88 corresponding to a desired height. Also, while not shown in FIG. 8, it is to be understood that the drive axle is coupled to a second bell crank pivotally coupled to frame 72 at a location on the opposite side of frame 72 as rear bell crank 84, thereby allowing rear drive wheels to be displaced equally when adjustments to height-of-cut are made. For this reason, the second bell crank (not shown) does not necessitate its own retractable pin member, allowing for a single height adjustment mechanism to be utilized.

Due to the inherent nature of rear bell crank 84, as the user pivots the rear bell crank 84 from one through-hole 88 to another, the rear drive wheels move along an arcuate path such that raising the height-of-cut causes rear drive wheels to move both downward and rearward relative to the user controls, while lowering the height-of-cut causes rear drive wheels to move both upward and forward relative the frame 72 and to the user controls. The user may then lock rear drive wheels in a desired position by engaging the pin member 87 with a desired through-hole 88.

Referring still to FIG. 8, in addition to the simultaneous height adjustment of both of rear drive wheels relative to frame 72 via a single height adjustment mechanism, walk-behind lawnmower 70 also provides for the simultaneous height adjustment of a pair of front caster wheel assemblies, which include front caster wheels 76a, 76b, via the same height adjustment mechanism. That is, a pair of height adjustment linkages 73a, 73b extend from the respective rear bell cranks (i.e., rear bell crank 84 and the corresponding opposite bell crank (not shown)) to a respective first leg of a pair of front bell cranks in the form of Y-shaped cranks 80a, 80b which are also pivotally coupled to respective wheel brackets 79a, 79b about respective second legs. Wheel brackets 79a, 79b are configured to rotatably support the caster wheels 76a, 76b via respective bearings 78a, 78b coupled to respective yokes 77a, 77b, each of which are configured to allow caster wheels 76a, 76b to rotate 360° about a vertical axis through bearings 78a, 78b.

Each of the front Y-shaped cranks 80a, 80b is also pivotally coupled to a respective deck bracket 82a, 82b, which extends from a surface of the mower deck 74. In this way, when the pair of rear bell cranks 84 are moved during desired height-of-cut adjustment, the pair of height adjustment linkages 73a, 73b impart corresponding movement on the front Y-shaped cranks 80a, 80b relative to mower deck 74, with the Y-shape allowing for arcuate movement of the front caster wheels 76a, 76b in direct proportion to the arcuate movement of the rear drive wheels. Thus, proportional height adjustment of all four wheels of the walk-behind lawnmower 70 is attainable via a single height adjustment mechanism, while also maintaining a substantially constant wheel base between the front caster wheels 76a, 76b and the rear drive wheels (not shown), regardless of the height-of-cut selected.

In addition to the front Y-shaped cranks 80a, 80b, the height adjustment configuration for the front caster wheels 76a, 76b further includes a respective pair of front pivoting linkages 81a, 81b, with front pivoting linkages 81a, 81b being pivotally coupled to wheel brackets 79a, 79b and deck brackets 82a, 82b at locations vertically in-line with the pivot locations of respective Y-shaped cranks 80a, 80b. In this way, Y-shaped cranks 80a, 80b and front pivoting linkages 81a, 81b act to substantially form a 4-bar linkage-type arrangement. With such a 4-bar linkage-type arrangement, the vertical alignment of front caster wheels 76a, 76b remains substantially constant through the vertical axis of bearings 78a, 78b, regardless of the selected height of front caster wheels 76a, 76b and the rear drive wheels. Thus, with no angular cant to the front caster wheels 76a, 76b relative to the frame 72 and mower deck 74 during height-of-cut adjustments, the front caster wheels 76a, 76b will not be prone to "wobble" dependent upon the selected height-of-cut, thereby improving contact with the ground and alignment of the front caster wheels 76a, 76b relative to the desired direction of travel.

As is also shown in FIG. 8, at least one of the height adjustment linkages 73a, 73b may be coupled to an extension spring 75, wherein the extension spring(s) 75 is configured to assist in the raising and lowering of rear drive wheels and front caster wheels 76a, 76b relative to frame 72. In this way, as the user removes pin member 87 to adjust the height-of-cut, the extension spring(s) 75 may act to aid the user in raising the height-of-cut (i.e., lowering the wheels relative to the frame 72) by effectively pulling on at least one of the height adjustment linkages 73a, 73b and rear bell cranks 84 in a forward direction. Conversely, the extension spring(s) 75 also may aid in the lowering of the height-of-cut by dampening the upward movement of the wheels, which, without the extension spring(s) 75, would otherwise be abrupt due to the overall weight of the frame 72 and the various components coupled to frame 72 (e.g., the engine, hydrostatic transmission, etc.).

Figure 9:
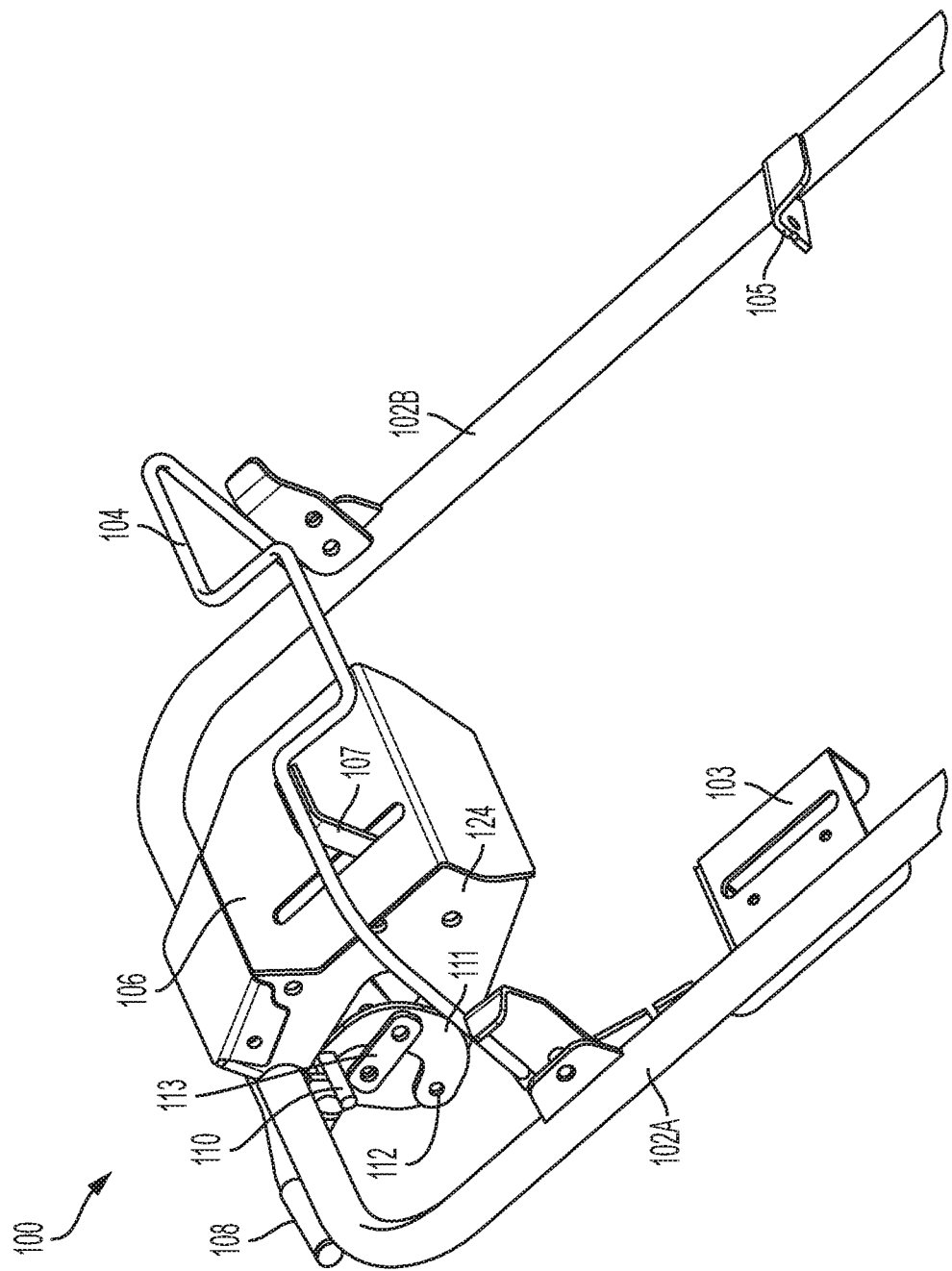
FIG. 9 is a partial front perspective view of a user control assembly for a walk-behind lawnmower in accordance with an aspect of the disclosure.
Figure 10:
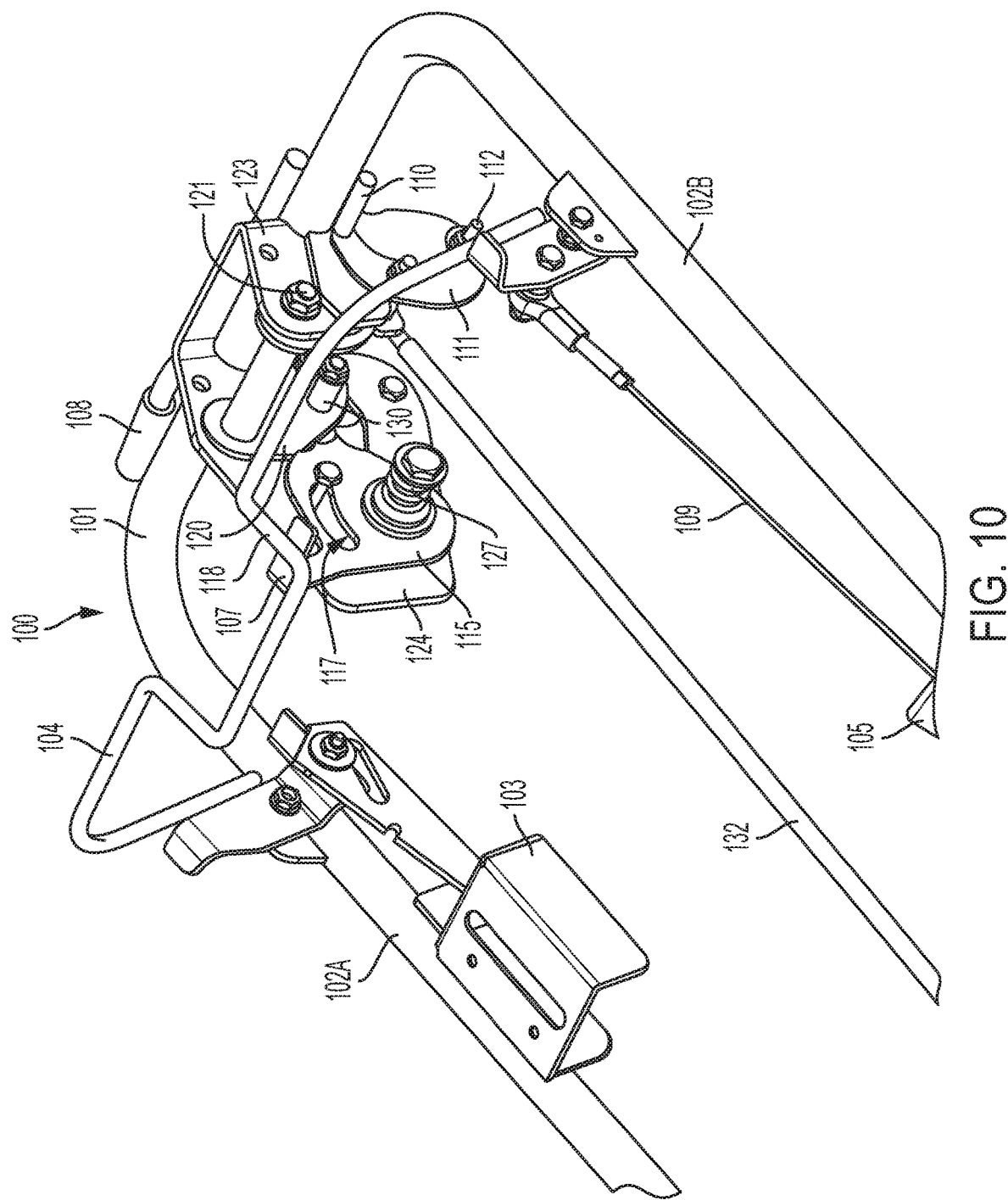
FIG. 10 is another partial front perspective view of the user control assembly of FIG. 9.

Next, referring to FIGS. 9-14, a control assembly 100 for use with a walk-behind lawnmower (such as, e.g., lawnmower 10 described above) according to another aspect of the disclosure is shown. Control assembly 100 is configured to enable the user to control the speed and direction of the drive wheels of the lawnmower while maintaining at least one hand on or near the control handle at all times. More specifically, control assembly 100 includes a crossbar handle 101 positioned between a pair of extended arms 102a, 102b, which are each coupled to a frame (not shown) of the lawnmower. As shown in FIGS. 9-10, the extended arm 102a may include a throttle control bracket 103, which may be configured to support a throttle control lever (not shown) coupled to the engine. Additionally, an operator presence control bar 104 may be pivotally coupled to each of extended arms 102a, 102b, with an operator presence cable bracket 105 being provided on extended arm 102b so as to support an operator presence cable 109 (shown in FIG. 10). The purpose and function of both the throttle control system and operator presence system utilizing operator presence control bar 104 are well-known and, thus, will not be described in further detail herein.

Control assembly 100 also includes a control housing 106, wherein control housing 106 is configured to support and/or protect various components for speed/direction control of the walk-behind lawnmower. For example, a speed control lever 107 may extend from a top surface of control housing 106 so as to be easily accessible by the user, with speed control lever 107 being pivotable about a pivot axis 116 relative to control housing 106 in order to allow the user to manually select a particular forward speed based on, e.g., terrain, mowing conditions, user comfort, etc. Additionally, a forward speed control handle 108 may be coupled to one or more primary arcuate brackets 120, with arcuate bracket(s) 120 being coupled between respective walls 123, 124 of the control housing 106 about a pivot axis 121. One or more reverse speed control handles 110 may also be provided, with the one or more reverse speed control handles 110 being coupled to one or more respective secondary arcuate brackets 111 about a pivot axis 112. As will be set forth in further detail below, the maximum forward speed of the lawnmower may be selected based upon the user-selected position of speed control lever 107. Furthermore, the arcuate bracket(s) 120 and the arcuate bracket(s) 111 may be linked together so as to provide both forward and reverse control inputs to the hydrostatic transmission (not shown) of the lawnmower via a single control linkage 132.

Figure 11:
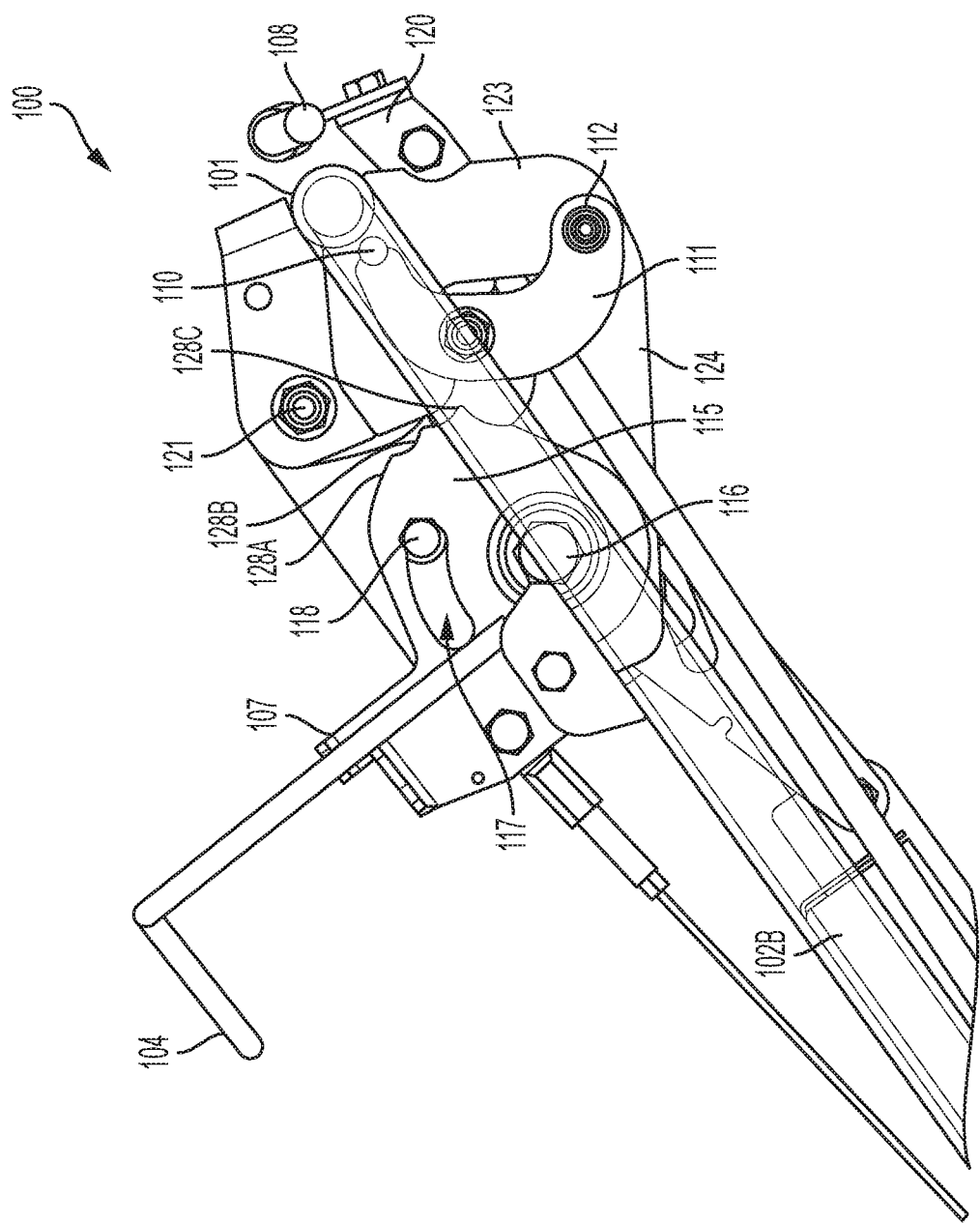
FIG. 11 is a side cross-sectional view of the user control assembly of FIG. 9.
Figure 12:
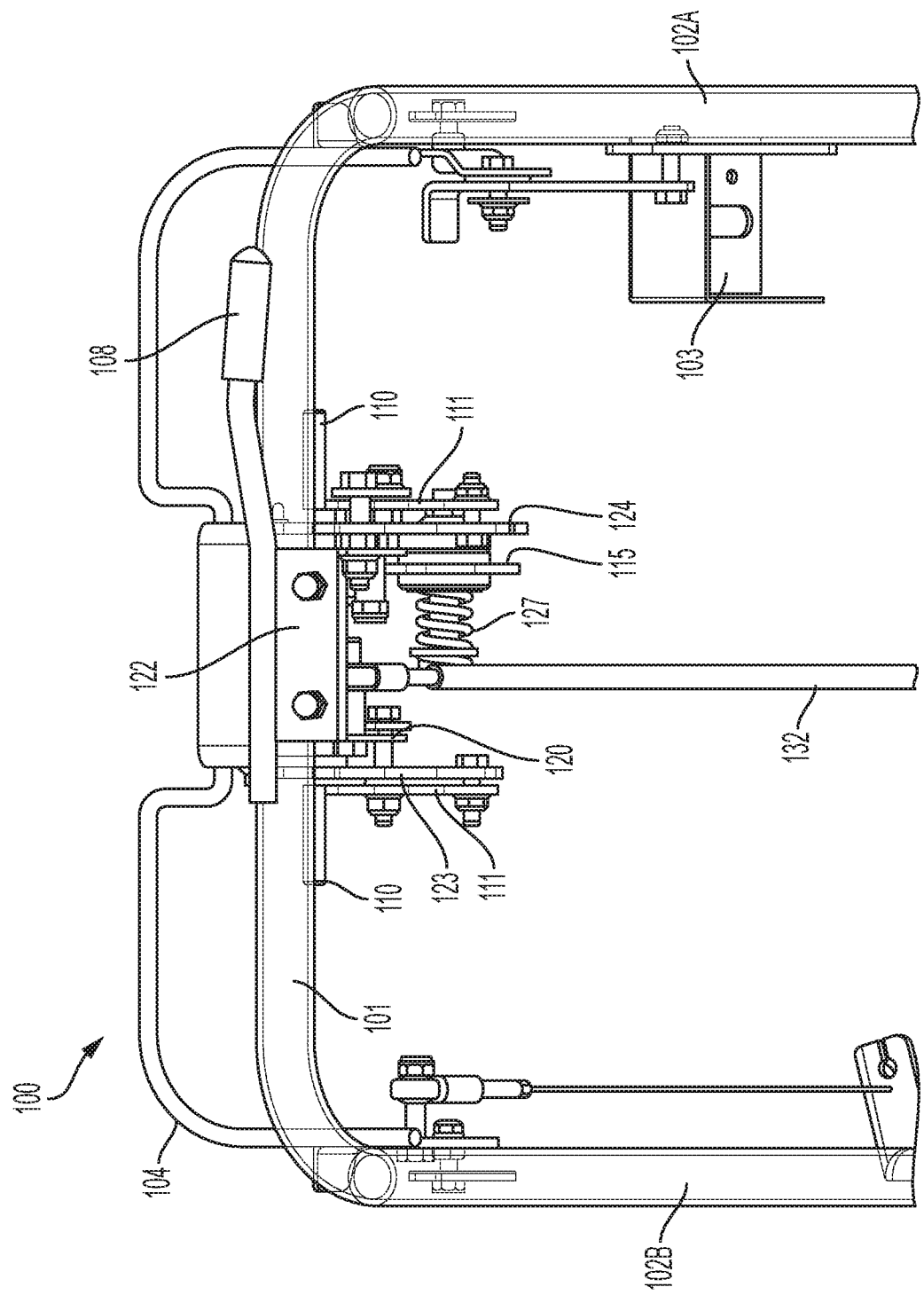
FIG. 12 is an underside view of the user control assembly of FIG. 9.
Figure 13:
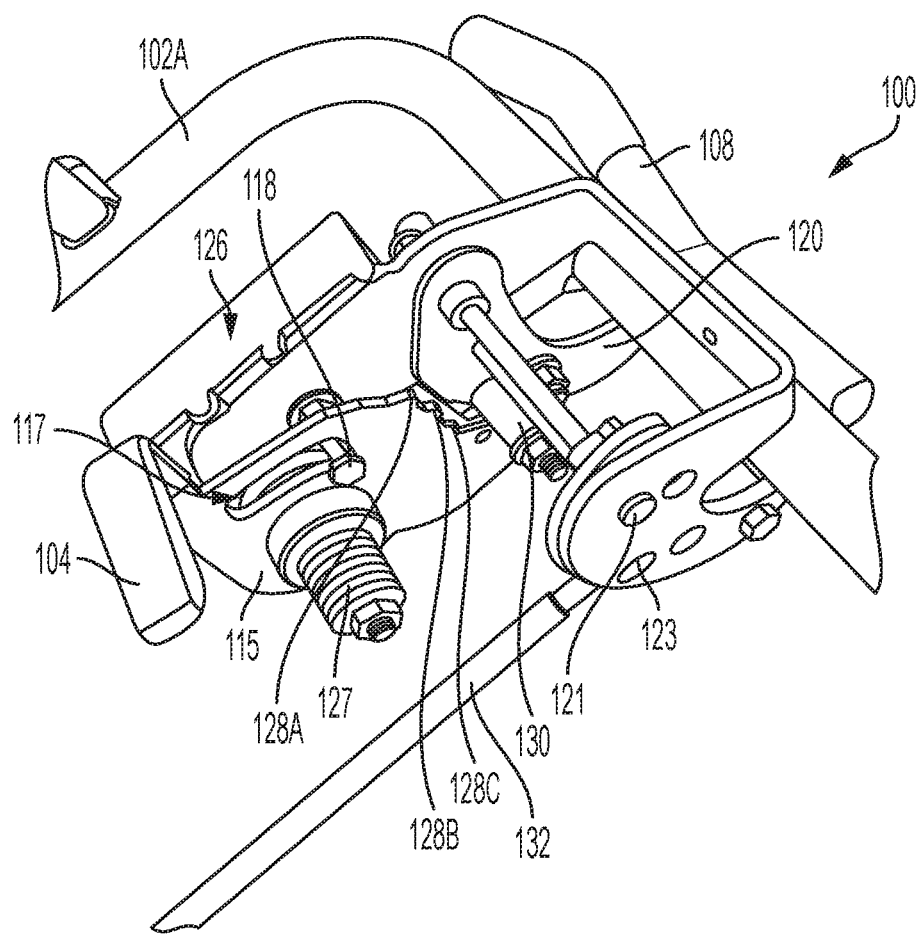
FIG. 13 is another partial front perspective view of the user control assembly of FIG. 9.

As illustrated in FIGS. 10-13, speed control lever 107 extends from an asymmetric body portion 115, with pivot axis 116 extending through asymmetric body portion 115. A curved slot 117 may be formed within asymmetric body portion 115. A post 118 may extend from a wall 124 of control housing 106 so as to at least partially pass through the curved slot 117, with the post 118 being configured to form a stop at each respective end of the curved slot 117, delineating the "minimum" and "maximum" speed control settings. Referring to FIG. 13, a portion of the control housing 106 proximate the speed control lever 107 may include a forward speed range indicator 126, providing the user with a visual indication of any number of possible forward speed settings (e.g., "maximum", "3", "2", "minimum", etc.). Furthermore, as shown in FIGS. 10, 12, and 13, a compression spring assembly 127 may be provided so as to securely hold the speed control lever 107 (and asymmetric body portion 115) in a desired position based on a user-selected forward speed setting, while still allowing for manipulation of the speed control lever 107 when enough torque is applied to overcome the compressive force of the spring.

Referring FIGS. 11 and 13, asymmetric body portion 115 includes a plurality of tooth-like projections 128a, 128b, 128c which extend from a radial edge of the asymmetric body portion 115. While three projections 128a, 128b, 128c are shown in FIGS. 11 and 13, it is to be understood that more or fewer projections may be utilized. Due to their position on the radial edge of asymmetric body portion 115, projections 128a, 128b, 128c (and/or the valleys therebetween) are configured to form a plurality of stop positions to limit the travel of forward speed control handle 108 and, more particularly, the travel of the one or more primary arcuate brackets 120 coupled to the forward speed control handle 108.

Specifically, the one or more primary arcuate brackets 120 may include a post 130 extending inwardly therefrom, wherein post 130 is sized and configured to engage the asymmetric body portion 115 at or between the projections 128a, 128b, 128c, with the exact engagement point being dependent upon the user-defined speed setting of speed control lever 107. The one or more primary arcuate brackets 120 are configured to pivot about the pivot axis 121, thereby allowing post 130 extending therefrom to travel along an arcuate path as the user presses forward and downward upon forward speed control handle 108 to facilitate forward motion of the lawnmower. In FIGS. 10, 11, and 13, speed control lever 107 is shown in its "maximum" speed position, with post 118 engaging with the end of slot 117 to prevent the asymmetric body portion 115 from further "forward" rotation. Accordingly, in this "maximum" speed position, the one or more primary arcuate brackets 120 and forward speed control handle 108 are allowed to move along a maximum-length arcuate path, thereby linearly displacing the control linkage 132 coupled to the one or more primary arcuate brackets 120 to a defined "maximum" extent, which, in turn, drives the hydrostatic transmission (not shown) at a defined "maximum" speed.

In this "maximum" speed position, the post 130 will eventually engage with the asymmetric body portion 115 at or near, e.g., projection 128c. However, as the user reduces the forward speed position by pulling back on speed control lever 107, the shape of asymmetric body portion 115 is configured such that the arcuate path achievable by the one or more primary arcuate brackets 120 is limited. For example, if the user were to pull speed control lever 107 to its "minimum" setting, one or more of the projections 128a, 128b, 128c are moved closer to the one or more arcuate brackets (and associated post 130) due to the shape of asymmetric body portion 115. Thus, in the "minimum" speed setting, as the user presses forward and downward upon forward speed control handle 108 to cause forward motion of the lawnmower, the post 130 contacts the asymmetric body portion 115 at or near one or more of the projections 128a, 128b, 128c earlier along the arcuate path of the one or more primary arcuate brackets 120, thereby reducing the linear displacement of control linkage 132. Accordingly, as the travel of the control linkage 132 is limited, the input to the hydrostatic transmission is similarly limited, thereby providing for a reduced forward speed.

In the configurations shown in 9-14, the forward speed control handle 108 is shown as being positioned substantially near the crossbar handle 101, slightly behind and below the crossbar handle 101 relative to the user. Due to this position, along with position of pivot axis 121 and the arcuate path of travel of the one or more primary arcuate brackets 120, the forward speed control handle 108 allows for the user to use the palm and/or thumb of a single hand to control forward speed of the lawnmower, while still enabling the user to hold the crossbar handle 101 with the fingers of the same hand. Referring to FIG. 12, the control handle 108 is shown as being located solely on the operator's right-hand side relative to the direction of forward travel. However, it is to be understood that the mounting bracket 122 which couples control handle 108 to the one or more primary arcuate brackets 120 may allow for reversible mounting such that control handle 108 may instead be located on the operator's left-hand side. Additionally and/or alternatively, while only a single-sided control handle 108 is shown, it is to be understood that the control handle 108 may be configured so as to have both a right-hand side and a left-hand side handle portion.

Still referring to FIGS. 9-14, as noted above, control assembly 100 may further include one or more reverse speed control handles 110. As opposed to requiring the user to effectively "pull" backward on the control handle 108 to cause the hydrostatic transmission to drive the lawnmower in reverse, the one or more reverse speed control handles 110 provide for a more ergonomically pleasing mechanism to linearly displace the control linkage 132 in a reverse direction, thereby driving the lawnmower in reverse.

As is best shown in FIGS. 10-12 and 14, the one or more reverse speed control handles 110 may be coupled to one or more respective secondary arcuate brackets 111 about a pivot axis 112. The secondary arcuate bracket(s) 111 may be pivotally coupled to the one or more primary arcuate brackets 120 by one or more links 113. Thus, any movement of the secondary arcuate bracket(s) 111 results in corresponding movement of the arcuate bracket(s) 120, and vice versa, which also moves control linkage 132. Thus, the combination of, and interrelation between, the secondary arcuate bracket(s) 111 and the primary arcuate bracket(s) 120 provides both forward and reverse control inputs to the hydrostatic transmission (not shown) of the lawnmower via the single control linkage 132.

As shown in FIGS. 9-14, the one or more reverse speed control handles 110 are positioned slightly in front of and slightly below the crossbar handle 101 relative to the operator. In this position, the operator may easily manipulate the reverse speed control handle(s) 110 using one or more fingers of one or more hands, while also maintaining a grip on crossbar handle 101. This positioning of reverse speed control handle(s) 110 allows the operator to naturally "pull" the lawnmower in the reverse direction, without the need to release their grip on crossbar handle 101 and/or manipulate the forward speed control handle 108.

Figure 14:
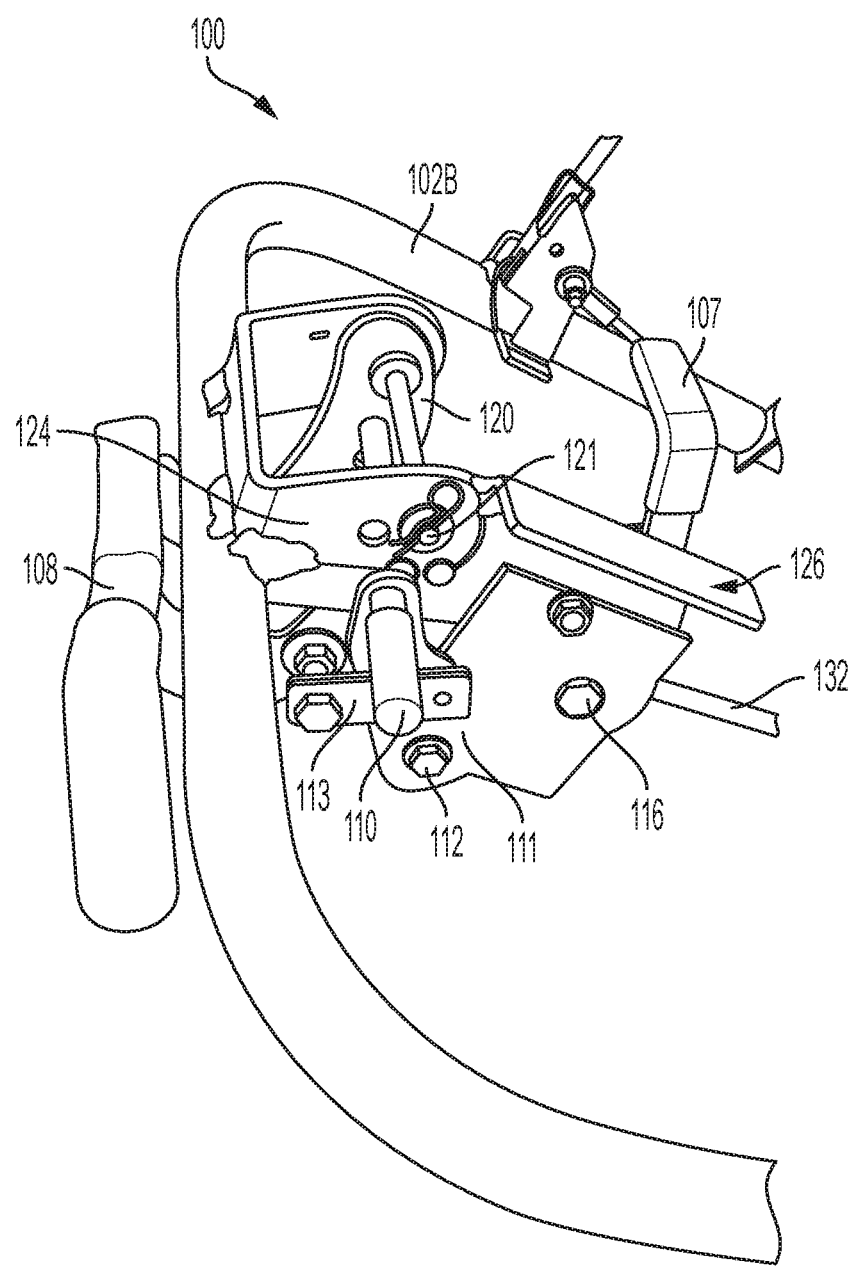
FIG. 14 is another partial front perspective view of the user control assembly of FIG. 9.

While FIGS. 9-12 illustrate a pair of reverse speed control handles 110, it is to be understood that only a single reverse speed control handle 110 may be utilized, as is illustrated in FIGS. 13-14.

Figure 15:
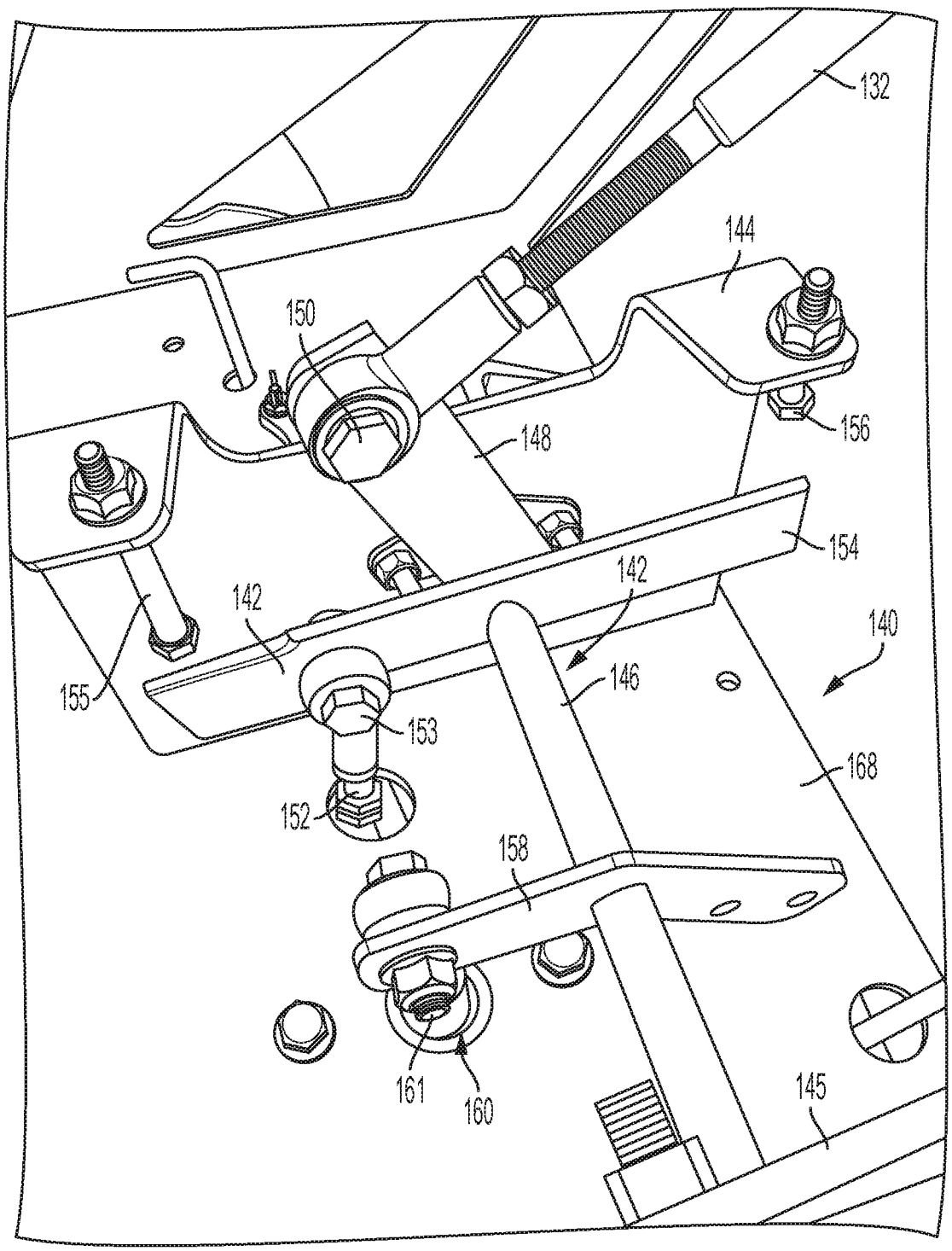
FIG. 15 is a transmission linkage assembly in accordance with an aspect of the disclosure.

Next, referring to FIG. 15, a hydrostatic transmission linkage assembly 140 in accordance with another aspect of the disclosure is shown. Hydrostatic transmission linkage assembly 140 may be configured for use with control assembly 100 described above so as to control the forward and/or reverse directional inputs to the hydrostatic transmission (not shown) from the control linkage 132.

Hydrostatic transmission linkage assembly 140 may include a pivoting member 141, wherein pivoting member 141 includes an axle portion 146 pivotable between a first wall 144 and a second wall 145, with each wall 144, 145 extending from an upper surface of a lawnmower frame 168 substantially above the hydrostatic transmission (not shown) driving the rear wheels of the lawnmower. The pivoting member 141 includes a plurality of arms extending therefrom, with each arm configured to translate a control arm of the hydrostatic transmission (not shown) based on the directional input from the control linkage 132 and/or limit the rotational movement of the pivoting member 141. Specifically, pivoting member 141 includes a first arm 148 extending therefrom, which is configured to couple the control linkage 132 to the hydrostatic transmission about a pivot axis 150. A second arm 142 and a third arm 154 extend from opposite lateral sides of axle portion 146, with second arm 142 being coupled to a transmission linkage 152 at a pivot axis 153 such that rotation of pivoting member 141 about axle portion 146 leads to vertical translation of the transmission linkage 152, thereby controlling the hydrostatic transmission (not shown) to drive in forward and/or reverse directions.

Referring still to FIG. 15, the first wall 144 further includes a pair of limit screws 155, 156. The length of limit screws 155, 156 may be adjustable by any or all of the manufacturer, a fleet manager, a user, etc., so as to limit the rotational movement of the pivoting member 141 in multiple directions, thereby providing for additional maximum speed controls in both the forward and reverse directions. For example, as shown in FIG. 15, limit screw 155 is shown as extending further downward than limit screw 156, with limit screw 155 configured to control the maximum speed in the reverse direction and limit screw 156 configured to control the maximum speed in the forward direction. If control linkage 132 is "pulled" in the reverse direction by the user so as to cause reverse drive, the second arm 142 may only pivot upwards until the point where a top surface of the second arm 142 contacts the limit screw 155, thereby limiting the speed of reverse travel. Conversely, if control linkage 132 is "pushed" in the forward direction by the user so as to cause forward drive, an upper surface of the third arm 154 may contact the limit screw 156, thereby limiting the speed of forward travel. As noted above, the length/depth of limit screws 155, 156 may be adjusted by the manufacturer, a fleet manager, and/or the user, dependent upon various factors.

FIG. 15 also shows a fourth arm 158 coupled to axle portion 146 of pivoting member 141. Fourth arm 158 is pivotally coupled, via a pivot axis 161, to a spring biasing member 160, wherein spring biasing member 160 is configured to bias the position of transmission linkage 152 to a "neutral" position if and when control linkage 132 is not being actively moved in the forward or reverse direction by the user. Thus, when the user releases both the forward speed control handle 108 and reverse speed control handle(s) 110, as described above, the spring biasing member 160 returns the transmission linkage 152 to a neutral position such that the lawnmower is moved in neither the forward or reverse directions when not under active control by the user.

Figure 16:
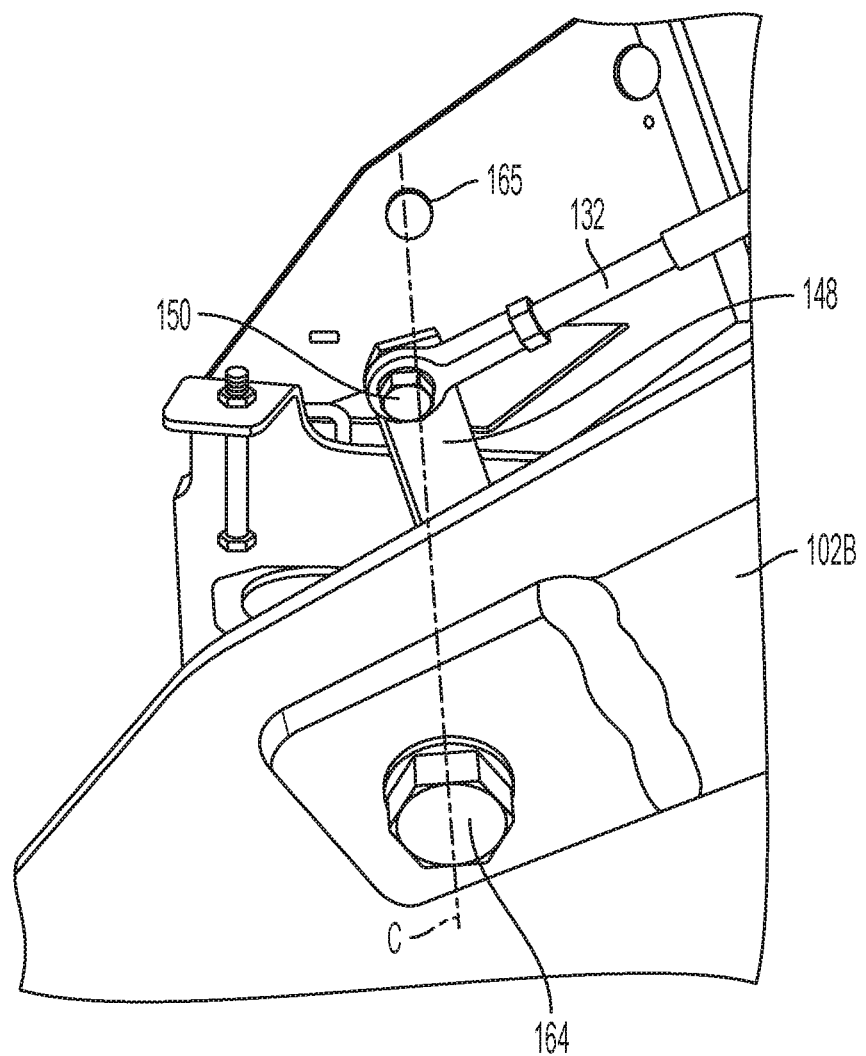
FIG. 16 is a side view of the transmission linkage assembly of FIG. 15.

Next, referring to FIG. 16, the position of pivot axis 150 on first arm 148 is illustrated in relation to respective pivot joints 164, 165 of extended arms 102b, 102a, respectively. As is shown, pivot axis 150 is substantially aligned along an axis C with pivot joints 164, 165. With this configuration, if the user were to pivot the extended arms 102a, 102b for transport, storage, etc., the distal end of control linkage 132 pivots about the same axis (i.e., axis C), thereby enabling the user control interface (extended arms and control assembly) to be pivoted without necessitating the decoupling of control linkage 132 from either the pivoting member 141 or the arcuate bracket(s) 120. That is, if pivot axis 150 were not aligned with pivot joints 164, 165, the control linkage 132 would bind at a certain angular position, thereby limiting the folding position of extended arms 102a, 102b. However, with the pivot axis 150 aligned with pivot joints 164, 165, no such binding occurs.

While FIGS. 1-16 illustrate various assemblies associated with a walk-behind lawnmower, it is to be understood that the features described herein may also be applicable to other types of outdoor power equipment, such as, e.g., aerators, seeders, turf cutters, brushcutters, rototillers, powered vacuums, powered leaf blowers, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An outdoor power equipment unit comprising:
   a frame;
   a power head coupled to the frame;
   a hydrostatic transmission coupled to the frame and operatively coupled to the power head, wherein the hydrostatic transmission comprises a drive gear configured to rotate about a first axis;
   a pair of rear drive wheels coupled at respective ends of a rear drive axle, wherein the rear drive axle is operably coupled to a driven gear, and further wherein the pair of rear drive wheels, the rear drive axle, and the driven gear are configured to rotate about a second axis different than the first axis;
   a drive chain operably coupled to both the drive gear and the driven gear; and
   a wheel height adjustment mechanism, wherein the wheel height adjustment mechanism comprises a first bell crank pivotally coupled to the frame about the first axis, wherein a first end of the first bell crank is coupled to the rear drive axle, and wherein a second end of the first bell crank is coupled to a retractable pin member;
   wherein a portion of the frame includes a plurality of incrementally-spaced through-holes, and further wherein the retractable pin member is configured to selectively engage with a user-selected one of the plurality of through-holes.

2. The outdoor power equipment of claim 1, wherein the first bell crank is pivotally coupled to the frame at a location proximate a first rear wheel of the pair of rear drive wheels, and further comprising a second bell crank pivotally coupled to the frame about the first axis at a location proximate a second rear wheel of the pair of rear [[drove]] drive wheels.

3. The outdoor power equipment of claim 2, further comprising a pair of front wheels.

4. The outdoor power equipment of claim 3, further comprising a third bell crank pivotally coupled to one of the frame or a mower deck fixedly coupled to the frame, wherein the third bell crank is pivotally coupled at a location proximate a first front wheel of the pair of front wheels, and a fourth bell crank pivotally coupled to one of the frame or the mower deck fixedly coupled to the frame, wherein the fourth bell crank is pivotally coupled at a location proximate a second front wheel of the pair of front wheels.

5. The outdoor power equipment of claim 4, further comprising at least one linkage extending between at least one of the first bell crank and the second bell crank and at least one of the third bell crank and the fourth bell crank.

6. The outdoor power equipment of claim 5, further comprising at least one extension spring, wherein a first end of the at least one extension spring is coupled to one of the frame or the mower deck and a second end of the at least one extension spring is coupled to the at least one linkage.

7. The outdoor power equipment of claim 4, further comprising a first linkage extending between the first bell crank and the third bell crank and a second linkage extending between the second bell crank and the fourth bell crank.

8. The outdoor power equipment of claim 4, wherein the pair of front wheels comprises a first caster wheel assembly and a second caster wheel assembly.

9. The outdoor power equipment of claim 8, wherein the third bell crank and the fourth bell crank are each configured as a Y-shaped crank.

10. The outdoor power equipment of claim 9, further comprising a first front pivoting linkage and a second front pivoting linkage pivotally coupled to the respective first caster wheel assembly and second caster wheel assembly at a position vertically in-line with a pivoting location of the third bell crank and the fourth bell crank, respectively, so as to form a 4-bar linkage-type arrangement.

11. The outdoor power equipment of claim 1, wherein the hydrostatic transmission is operably coupled to the power head via a drive belt.

12. The outdoor power equipment of claim 1, further comprising a mower deck positioned between a pair of front wheels and the pair of rear drive wheels.

13. The outdoor power equipment of claim 12, wherein the hydrostatic transmission, the power head, and the mower deck are fixed relative to the frame.

14. The outdoor power equipment of claim 13, wherein the hydrostatic transmission and the mower deck are powered by the power head via respective belt-and-pulley arrangements.

15. An outdoor power equipment unit comprising:
a frame;
a power head coupled to the frame;
a hydrostatic transmission coupled to the frame and operatively coupled to the power head via a belt drive, wherein the hydrostatic transmission comprises a drive gear configured to rotate about a first axis;

a pair of rear drive wheels coupled at respective ends of a rear drive axle, wherein the rear drive axle is operably coupled to a driven gear, and further wherein the pair of rear drive wheels, the rear drive axle, and the driven gear are configured to rotate about a second axis different than the first axis;
a drive chain operably coupled to both the drive gear and the driven gear; and
a wheel height adjustment mechanism, wherein the wheel height adjustment mechanism comprises a first bell crank pivotally coupled to the frame about the first axis, wherein a first end of the first bell crank is coupled to the rear drive axle;
wherein the hydrostatic transmission, the power head, and the mower deck are fixed relative to the frame;
wherein the hydrostatic transmission and the mower deck are powered by the power head via respective belt-and-pulley arrangements; and
wherein both an angle of each belt and an angle of each pulley in the respective belt-and-pulley arrangements remain constant regardless of the height of the pair of rear drive wheels and the pair of front wheels relative to the frame.

16. A walk-behind lawnmower comprising:
a frame;
a power head coupled to the frame;
a mower deck coupled to the frame;
a hydrostatic transmission coupled to the frame and operatively coupled to the power head, wherein the hydrostatic transmission comprises a drive gear configured to rotate about a first axis;
a pair of front wheels;
a pair of rear drive wheels coupled at respective ends of a rear drive axle, wherein the rear drive axle is operably coupled to a driven gear, and further wherein the pair of rear wheels, the rear drive axle, and the driven gear are configured to rotate about a second axis;
a drive chain operably coupled to both the drive gear and the driven gear;
a wheel height adjustment mechanism, wherein the wheel height adjustment mechanism comprises at least one rear bell crank pivotally coupled to the frame about the first axis, and further wherein a first end of the at least one rear bell crank is coupled to the rear drive axle such that movement of the rear drive axle relative to the frame does not affect tension of the drive chain between the drive gear and the driven gear; and
a retractable pin member coupled to a second end of the at least one rear bell crank, wherein the retractable pin member is configured to selectively engage with a user-selected one of a plurality of through-holes formed in a portion of the frame.

17. A walk-behind lawnmower comprising:
a frame;
a power head coupled to the frame;
a mower deck coupled to the frame;
a hydrostatic transmission coupled to the frame and operatively coupled to the power head, wherein the hydrostatic transmission comprises a drive gear configured to rotate about a first axis;
a pair of front wheels;
a pair of rear drive wheels coupled at respective ends of a rear drive axle, wherein the rear drive axle is operably coupled to a driven gear, and further wherein the pair of rear wheels, the rear drive axle, and the driven gear are configured to rotate about a second axis;

a drive chain operably coupled to both the drive gear and the driven gear; and a wheel height adjustment mechanism, wherein the wheel height adjustment mechanism comprises:
- at least one rear bell crank pivotally coupled to the frame about the first axis, wherein a first end of the at least one rear bell crank is coupled to the rear drive axle such that movement of the rear drive axle relative to the frame does not affect tension of the drive chain between the drive gear and the driven gear; and
- at least one linkage extending between the at least one rear bell crank and at least one front wheel bell crank coupled to at least one of the pair of front wheels such that height of the pair of front wheels relative to the frame is adjusted simultaneously with any height adjustment of the pair of rear drive wheels.

18. The outdoor power equipment of claim 15, further comprising a pair of front wheels.

19. The outdoor power equipment of claim 15, further comprising at least one linkage extending between at least one of the first bell crank and a second bell crank and at least one of a third bell crank and a fourth bell crank.

20. The walk-behind lawnmower of claim 17, further comprising a retractable pin member coupled to a second end of the at least one rear bell crank, wherein the retractable pin member is configured to selectively engage with a user-selected one of a plurality of through-holes formed in a portion of the frame.

* * * * *